United States Patent [19]

Buma et al.

[11] Patent Number: 4,949,262

[45] Date of Patent: Aug. 14, 1990

[54] ELECTRONIC CONTROLLED FLUID SUSPENSION SYSTEM WITH AN ADVANCE CONTROL AND A FEEDBACK CONTROL OF A VEHICLE ATTITUDE

[75] Inventors: Shuuichi Buma; Toshio Aburaya, both of Toyota; Takashi Yonekawa, Mishima; Osamu Takeda, Susono; Shingo Urababa, Toyota; Shunichi Doi, Nagoya, all of Japan

[73] Assignees: Kabushiki Kaisha Toyota Chuo Kenkyusho; Toyota Jidosha Kabushiki Kaisha, Aichi, Japan

[21] Appl. No.: 239,982

[22] Filed: Sep. 2, 1988

[30] Foreign Application Priority Data

| Sep. 3, 1987 | [JP] | Japan | 62-135015 |
| Sep. 3, 1987 | [JP] | Japan | 62-135014 |
| Sep. 4, 1987 | [JP] | Japan | 62-135884 |
| Jul. 28, 1988 | [JP] | Japan | 63-188873 |
| Aug. 4, 1988 | [JP] | Japan | 63-103453 |
| Aug. 4, 1988 | [JP] | Japan | 63-103454 |

[51] Int. Cl.$^5$ .................................................. B60G 21/00
[52] U.S. Cl. .................................. 364/424.05; 280/707
[58] Field of Search ............... 364/424.05, 424.01, 364/425; 280/707, 708, 702

[56] References Cited

U.S. PATENT DOCUMENTS

| 4,657,280 | 4/1987 | Ohmori | 280/707 |
| 4,691,284 | 9/1987 | Izumi et al. | 364/424.05 |
| 4,693,485 | 9/1987 | Kamei et al. | 280/6 R |
| 4,712,807 | 12/1987 | Kurosawa | 280/707 |
| 4,770,438 | 9/1988 | Sugasawa et al. | 280/707 |
| 4,807,128 | 2/1989 | Ikemoto et al. | 364/424.05 |
| 4,827,416 | 2/1989 | Kawagoe et al. | 364/424.05 |
| 4,829,434 | 5/1989 | Karmel et al. | 364/424.1 |

FOREIGN PATENT DOCUMENTS

| 0114757 | 8/1984 | European Pat. Off. |
| 0222329 | 5/1987 | European Pat. Off. |
| 0234552 | 9/1987 | European Pat. Off. |
| 0249246 | 12/1987 | European Pat. Off. |
| 3603346A1 | 8/1986 | Fed. Rep. of Germany |
| 60-152510 | 10/1985 | Japan |
| 61-59414 | 4/1986 | Japan |
| 61-150809 | 7/1986 | Japan |
| 61-178212 | 8/1986 | Japan |
| 62-96115 | 5/1987 | Japan |
| 649506A5 | 5/1985 | Switzerland |

OTHER PUBLICATIONS

Patent Abstracts of Japan, Oct. 9, 1987, vol. 11, No. 310, (M-630) [2757]; JP-A-62 96 119.

*Primary Examiner*—Thomas G. Black
*Attorney, Agent, or Firm*—Oliff & Berridge

[57] ABSTRACT

An electronic controlled fluid suspension system in which a change in a vehicle attitude is expected in advance by an advance control means responsive to a driving state detected by a driving state detection means, and the current vehicle attitude is feedback-controlled by a feedback control means. The shares of the advance control amount and the feedback control amount are calculated by a share determination means so that final control amount is determined based on the shares. Fluid flow to and from the fluid suspension is controlled by a fluid flow control means in response to the final control amount. In such control system, the advance control and the feedback control are smoothly switched, which results in improved maneuverability and stability of the vehicle.

8 Claims, 29 Drawing Sheets

ELECTRONIC CONTROLLED FLUID SUSPENSION SYSTEM WITH AN ADVANCE CONTROL AND A FEEDBACK CONTROL OF A VEHICLE ATTITUDE

BACKGROUND OF THE INVENTION

This invention relates to an electronic controlled fluid suspension system for controlling a vehicle attitude.

In order to improve ride comfort, maneuverability and stability of a vehicle, various types of systems for reducing pitch and roll have been developed. One of them is presented in the publication of unexamined Japanese Utility Model Application No. 61-59414. In this prior art reference, when a steering wheel is suddenly turned at a steering angle speed exceeding a preset value, an advance control is executed. Namely, fluid is rapidly supplied to or discharged from a fluid actuator during a controlled time interval which is obtained from a map showing a relation between the controlling time interval and a vehicle speed and a steering angle speed. On the other hand, when the wheel is slowly steered at a steering angle speed smaller than the predetermined value, a feedback control is executed. Namely, fluid is supplied to or discharged from the fluid actuator during a controlled time interval based on a predetermined map relating the controlled time interval and a vehicle height which is maintained for a predetermined time interval.

The above-mentioned prior art suspension system, however, includes some problems. The advance control and the feedback control are executed alternatively on the basis of a predetermined steering angle speed. In such case, it is practically impossible to equalize the control amount of the advance control and that of the feedback control when the control mode is switched from one to the other, because it is difficult to take into account the friction coefficient and irregularities of a road surface and a load of the vehicle immediately after the control mode is switched. The difference of the control amount between the above-mentioned two modes is apt to produce a momentary change in the vehicle height, which impedes smooth control of the vehicle attitude.

There is also another problem. When the steering wheel is slowly turned, the feedback control is executed after the vehicle height is maintained for a predetermined time interval. Since the feedback control is not carried out until the predetermined time interval ends, smooth attitude control cannot be executed during the above-mentioned time interval.

SUMMARY OF THE INVENTION

It is an object of the present invention to provide an electronic controlled fluid suspension system in which the switching of the advance control and the feedback control is smoothly executed and control of vehicle attitude based on those controls can be cooperatively executed.

Another object of the present invention is to provide an electronic controlled fluid suspension system in which the advance control and the feedback control are executed based on a share corresponding to a driving condition of the vehicle for a smooth switching of the controls.

A further object of the present invention is to provide an electronic controlled fluid suspension system in which a momentary change in the vehicle height can be prevented even if the advance control and the feedback control are cooperatively executed.

To achieve these and other objects, the present invention has a constitution set forth as follows. Namely, the electronic controlled fluid suspension system of the present invention includes: a fluid actuator AC provided for each wheel W of the vehicle; a driving state detection means M1 for detecting driving parameters of the vehicle; an advance control means M2 responsive to the detected driving parameters for expecting a change in an attitude of the vehicle in advance and for generating an advance control amount in order to alleviate the change; a feedback control means M3 responsive to the detected driving parameters for generating a feedback control amount in order to feedback-control the current attitude of the vehicle; a share determination means M4 responsive to the detected driving parameters for determining shares of the advance control amount and the feedback control amount; a control amount generating means M5 for generating a final control amount from the advance control amount and the feedback control amount according to the determined shares; a fluid flow control means M6 responsive to the final control amount for controlling fluid flow from and into the fluid actuators AC.

BRIEF DESCRIPTION OF THE DRAWINGS

By way of example and to make the description clearer, reference is made to the accompanying drawings in which.

DETAILED DESCRIPTION OF PREFERRED EMBODIMENTS

Set forth is the explanation of an embodiment of the present invention based on the attached drawings.

Figure 1:
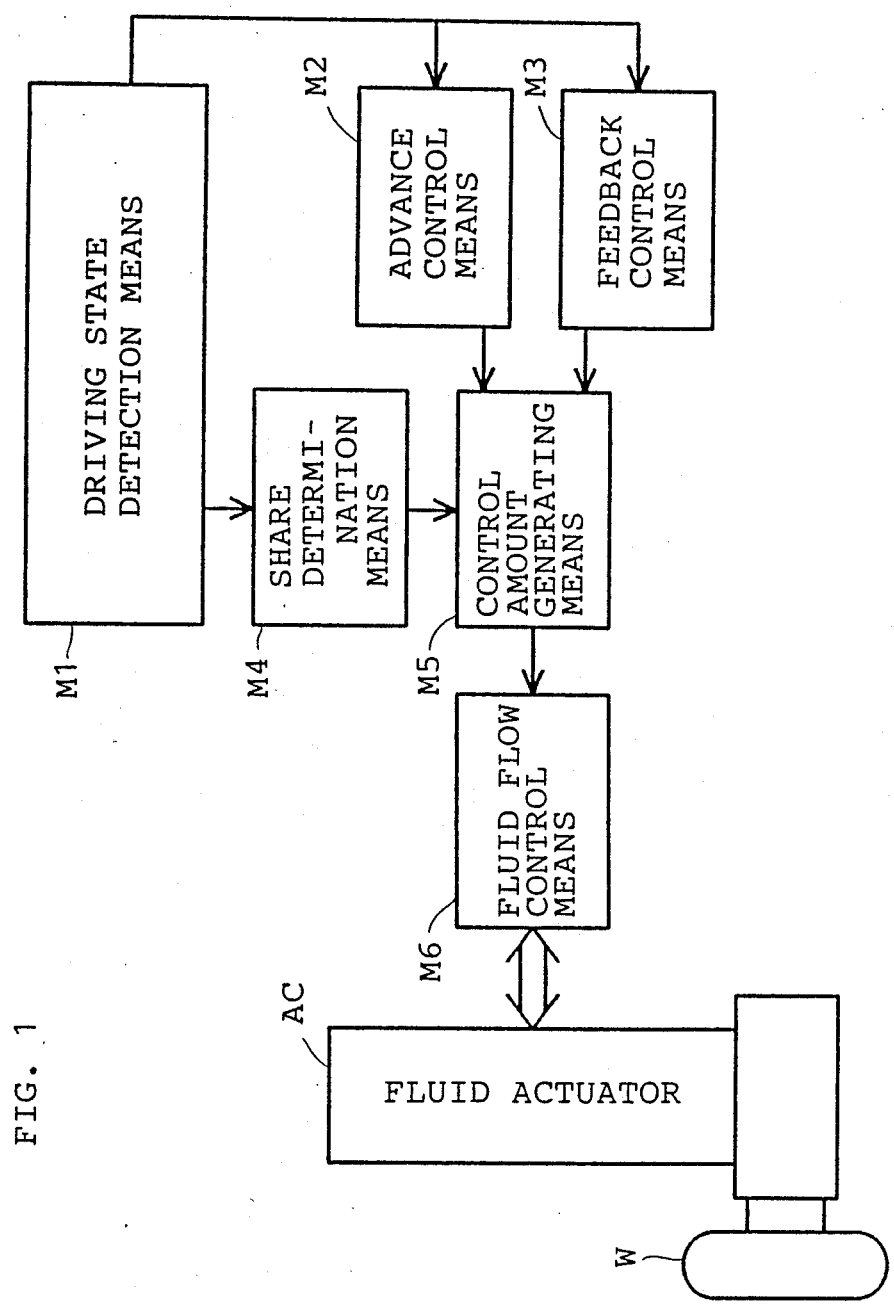
FIG. 1 is a block diagram indicating a fundamental structure of the present invention.
Figure 2:
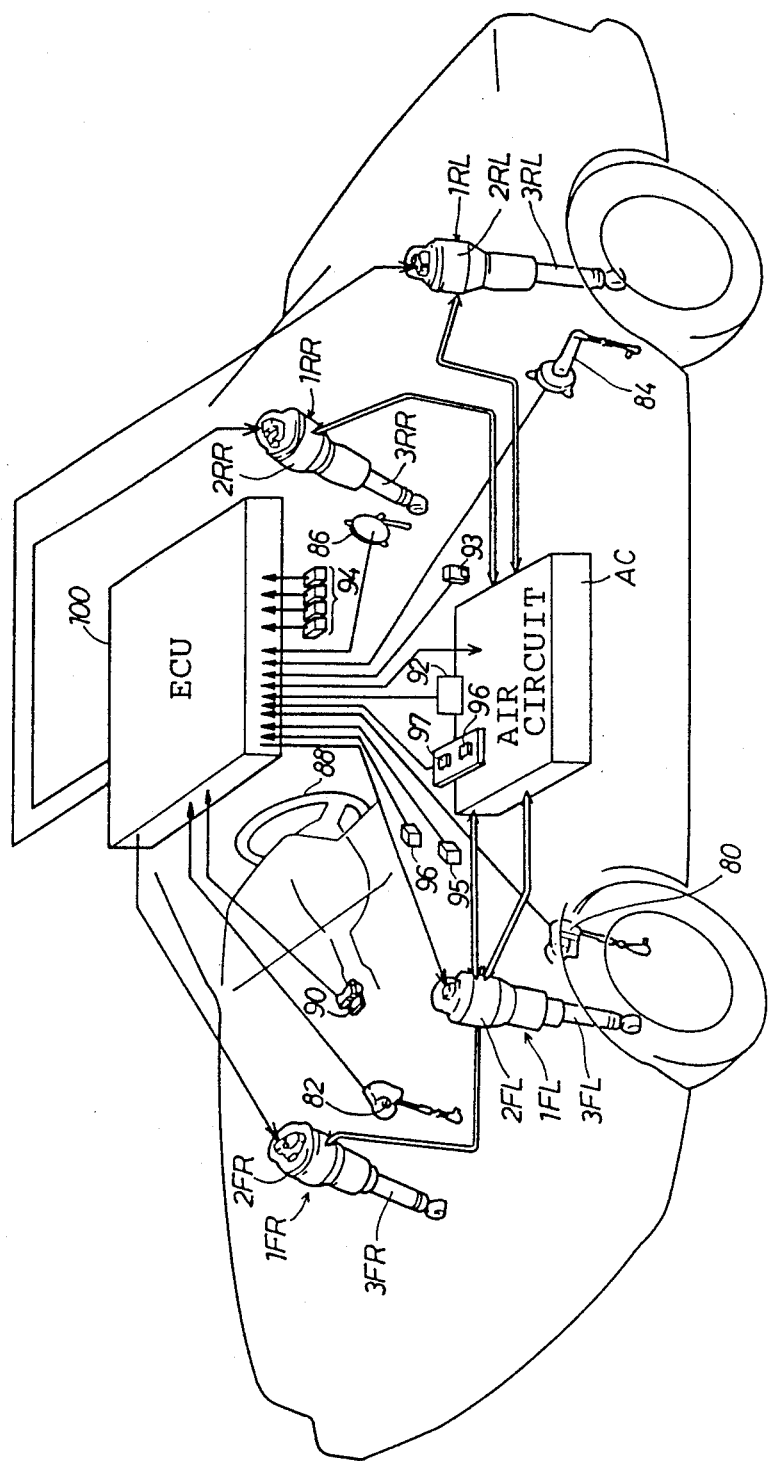
FIG. 2 is a schematic view of an electronic controlled air suspension system according to an embodiment of the present invention.
Figure 3:
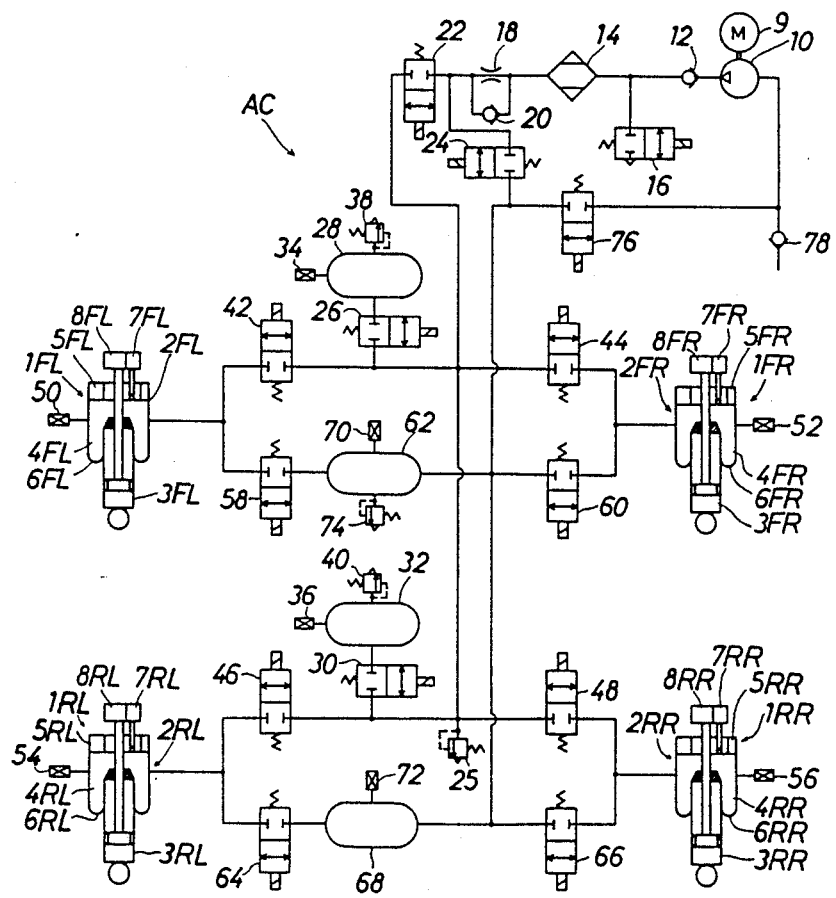
FIG. 3 is an air circuit diagram of the embodiment.

As shown in FIGS. 2 and 3, the electronic controlled air suspension system of the present embodiment is equipped with a front left suspension 1FL, a front right suspension 1FR, a rear left suspension 1RL and a rear right suspension 1RR, all of which are connected to an air circuit AC. These suspensions 1FL, 1FR, 1RL and 1RR are equipped with air springs 2FL, 2FR, 2RL and 2RR and shock absorbers 3FL, 3FR, 3RL and 3RR, respectively.

The air springs 2FL, 2FR, 2RL and 2RR are equipped with main air chambers 4FL, 4FR, 4RL and 4RR and auxiliary air chambers 5FL, 5FR, 5RL and 5RR, respectively. The main air chambers 4FL, 4FR, 4RL and 4RR are partially formed of diaphragms 6FL, 6FR, 6RL and 6RR so that the height of the vehicle can be changed by supplying and discharging air to and from the main air chambers 4FL, 4FR, 4RL and 4RR. The air springs 2FL, 2FR, 2RL and 2RR can have their spring constants changed to "low", "medium" and "high" states by energizing spring actuators 7FL, 7FR, 7RL and 7RR to either provide/block communications between the main air chambers 4FL, 4FR, 4RL and 4RR and the auxiliary air chambers 5FL, 5FR, 5RL and 5RR or to adjust the air flow rates. The shock absorbers 3FL, 3FR, 3RL and 3RR can have their damping force changed to "low", "medium" and "high" by energizing absorber actuators 8FL, 8FR, 8RL and 8RR to control the flow rate of working fluid passing through orifices (not shown).

The air circuit AC is equipped with a compressor 10 which is driven by a motor 9 so that it may act as a compressed air supply source for the air springs 2FL, 2FR, 2RL and 2RR. The compressor 10 has its discharge side connected to an air drier 14 and a discharge valve 16 through a check valve 12 for preventing back flow. Silica gel is provided in the air drier 14 to remove moisture from the compressed air. This air drier 14 is connected to one side of a supply valve 22 and a change-over valve 24 through a fixed throttle 18 and a check valve 20 for preventing back flow. The other side of the supply valve 22 is connected to a relief valve 25 set at a predetermined pressure, and through a high pressure reservoir valve 26 to a front high pressure reserve tank 28, and through another high pressure reservoir valve 30 to a rear high pressure reserve tank 32. The high pressure reserve tanks 28 and 32 are respectively equipped with pressure sensors 34 and 36 for detecting the air pressures therein and relief valves 38 and 40 set at a predetermined pressure.

The above-mentioned side of the supply valve 22 is further connected through a leveling valve 42 to the main air chamber 4FL, through a leveling valve 44 to the main air chamber 4FR, through a leveling valve 46 to the main air chamber 4RL, and through a leveling valve 48 to the main air chamber 4RR. Connected to these main air chambers 4FL, 4FR, 4RL and 4RR, respectively, are pressure sensors 50, 52, 54 and 56 for detecting the air pressures.

The main air chamber 4FL at the front left side and the main air chamber 4FR at the front right side are connected to a front low pressure reserve tank 62 through discharge valves 58 and 60. The main air chamber 4RL at the rear left side and the main air chamber 4RR at the rear right side are connected to a rear low pressure reserve tank 68 through discharge valves 64 and 66. Moreover, the front low pressure reserve tank 62 and the rear low pressure reserve tank 68 are connected to inter-communicate at all times. Connected to these low pressure reserve tanks 62 and 68, respectively, are pressure sensors 70 and 72 for detecting the air pressures therein. Connected to the front low pressure reserve tank 62, is a relief valve 74 which is set at a predetermined pressure.

These two low pressure reserve tanks 62 and 68 are connected to the other side of the aforementioned change-over valve 24 and further to the suction side of the compressor 10 through a suction valve 76. To the suction side of the compressor 10, there is connected a check valve 78 for intaking external air.

The present embodiment is otherwise practicable without the check valve 78 by making a closed gas circuit which is filled with air or other gas, e.g., nitrogen gas.

The aforementioned discharge valve 16, supply valve 22, change-over valve 24, high pressure reservoir valves 26 and 30, leveling valves 42, 44, 46 and 48, discharge valves 58, 60, 64 and 66, and suction valve 76 are electromagnetic valves of normally closed, two-position type in the present embodiment.

The present air circuit AC is equipped at its front side and rear side with two high pressure reserve tanks 28 and 32 and two low pressure reserve tanks 62 and 68. It is also possible to provide a common high pressure reserve tank and a common low pressure reserve tank.

As shown in FIG. 2, in the suspension system of the present embodiment, there are provided: a height sensor 80 for detecting the distance between the left front wheel and the vehicle body, i.e., the left front height; a height sensor 82 for detecting the right front height; a height sensor 84 for detecting the left rear height; and a height sensor 86 for detecting the right rear height. These vehicle height sensors 80, 82, 84 and 86 output signals corresponding to a difference between a detected vehicle height and a predetermined standard vehicle height. When the detected vehicle height is larger than the standard height, a positive signal corresponding to the difference is output. For a height equal to the standard height, a zero signal is output. For a height smaller than the standard height, a negative signal corresponding to the difference is output.

There are also provided: a known steering angle sensor 90 for detecting a steering angle of a steering wheel 88; a known acceleration sensor 92 for detecting the longitudinal and lateral accelerations of the vehicle body; a speed sensor 93 for detecting a vehicle speed based on a rotational speed of the output shaft of a transmission (not shown); a door switch 94 provided for each door to detect the closed condition of the door; a neutral switch 95 for sensing that the transmission is in the neutral position; a throttle opening sensor 96 for detecting the opening of the throttle valve of the internal combustion engine (not shown); and high and low level switches 97 and 98 which are manually operated to select the vehicle height.

Figure 4:
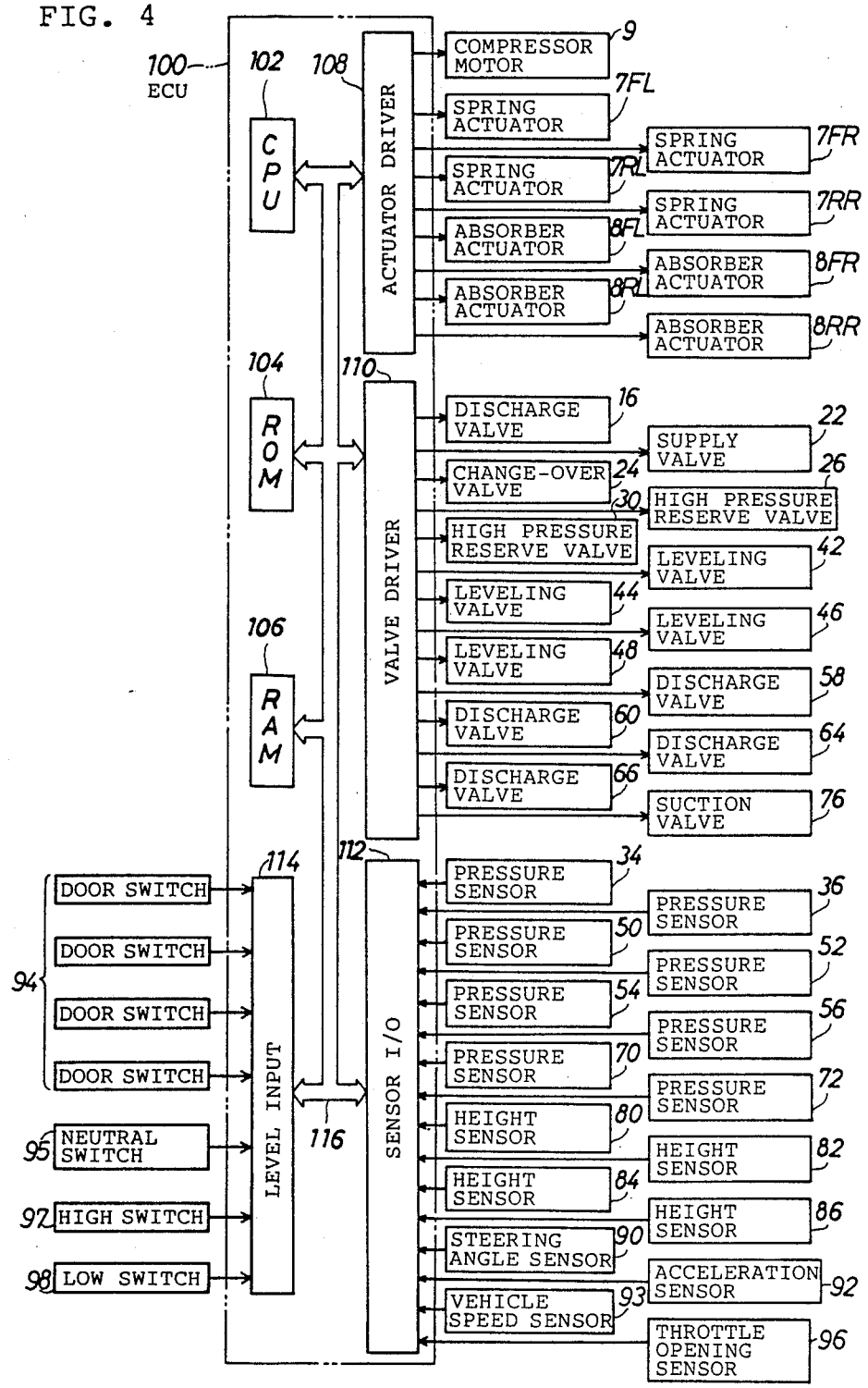
FIG. 4 is a block diagram indicating the constitution of an electric system according to the embodiment.

The electrical system of the present embodiment will be described with reference to the block diagram shown in FIG. 4. The aforementioned individual air suspensions 1FL, 1FR, 1RL and 1RR are driven and controlled by an electronic control unit (ECU) 100 to control the attitude of the vehicle. The ECU 100 is constructed as the center of a logical arithmetic circuit and includes, as shown in FIG. 4, known CPU 102, ROM 104 and RAM 106. These CPU 102, ROM 104 and RAM 106 are mutually connected with input/output circuits, such as an actuator driver 108, a valve driver 110, a sensor input circuit 112 and a level input circuit 114 by way of a common bus 116.

The CPU 102 receives signals from the pressure sensors 34, 36, 50, 52, 54, 56, 70 and 72, the height sensors 80, 82, 84 and 86, the steering angle sensor 90, the acceleration sensor 92, the speed sensor 93 and the throttle opening sensor 96 by way of the sensor input circuit 112, and the signals from the door switch 94, the neutral switch 95, and the high and low level switches 97 and 98 by way of the level input circuit 114. In response to these signals and the data in the ROM 104 and the RAM 106, the CPU 102 controls the individual air suspensions 1FL, 1FR, 1RL and 1RR by outputting drive signals to the compressor motor 9, the spring actuators 7FL, 7FR, 7RL and 7RR and the absorber actuators 8FL, 8FR, 8RL and 8RR through the actuator driver 108 and by outputting drive signals through the valve driver 110 to the discharge valve 16, the supply valve 22, the change-over valve 24, the high pressure reservoir valves 26 and 30, the leveling valves 42, 44, 46 and 48 the discharge valves 58, 60, 64 and 66 and the suction valve 76. The ROM 104 stores maps shown in FIGS. 10 through 21 and FIGS. 23 through 29.

Figure 5:
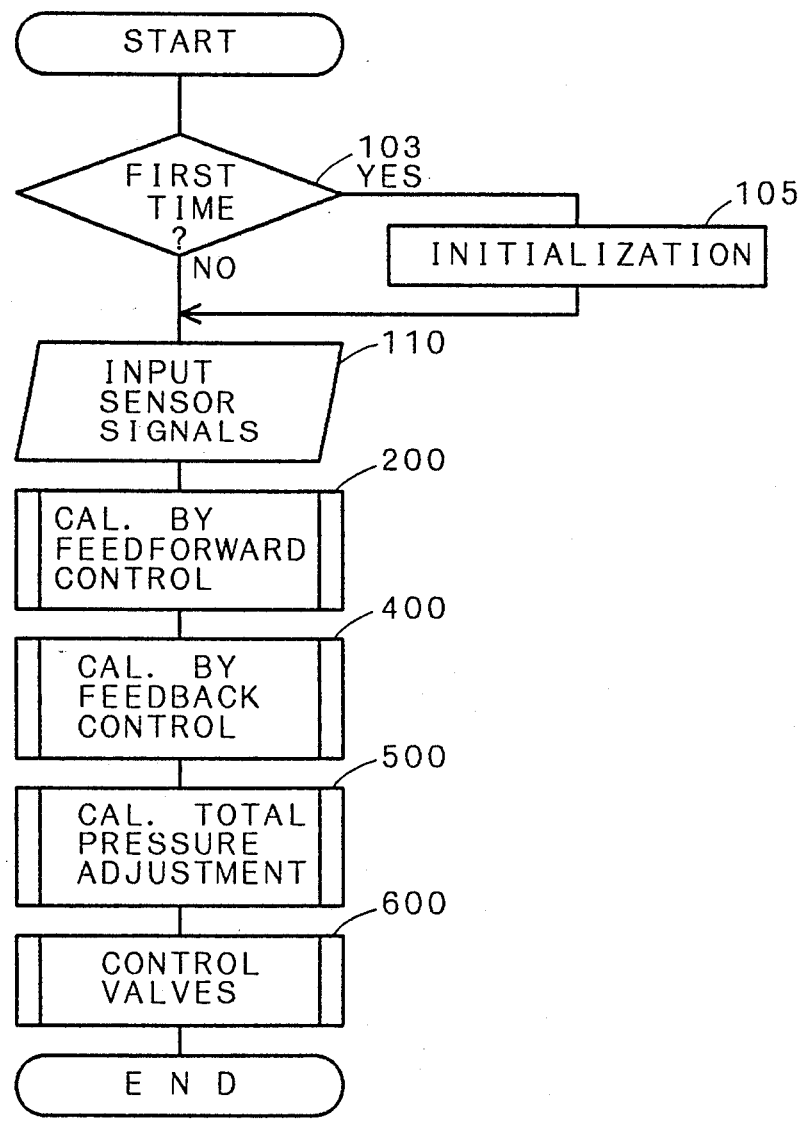
FIG. 5 is a general flowchart of a control routine executed in an electronic control unit of the embodiment.

Various calculations and control processes executed in the ECU 100 are explained with reference to the flowcharts of FIGS. 5 through 9B. FIG. 5 is a general flowchart indicating an example of an air suspension control according to present invention. FIGS. 6 through 9B are flowcharts detailing the steps shown in the flowchart of FIG. 5.

The process routine of FIG. 5 is repeatedly executed in a predetermined cycle (e.g., 8 msec). When the process routine is started, it is determined at step 103 whether or not this program is executed for the first time. If YES, the program proceeds to step 105 at which initialization of various flags and variables is executed. Subsequently, at step 110, signals output from the above-mentioned various sensors are input.

At step 200, a feedforward control is executed as the advance control for coping with a roll of the body. In the feedforward control, a lateral acceleration GRLM is expected which will develop on the vehicle body after the steering wheel is operated. The expectation is for the future farther than the execution cycle time of this routine and almost coincident with the cycle time of the actual valve control, which will be explained later. In response to the expected lateral acceleration GRLM, the control amounts (pressures) of the air springs 2FL, 2FR, 2RL and 2RR are calculated so that the roll is prevented or adjusted at a predetermined small angle.

At step 400, a feedback control is executed as one of the vehicle attitude controls for coping with the roll. In the feedback control, the control amounts (pressures) of the air springs 2FL, 2FR, 2RL and 2RR are calculated to stabilize the vehicle attitude under the condition that the acceleration of the vehicle is not changing greatly.

At step 500, total pressure adjustments for the wheels are calculated. Namely, the sum of pressure adjusting amounts obtained in the feedforward control and feedback control are calculated as the total pressure adjustment.

At step 600, a valve control is executed for opening/closing appropriate valves among the high pressure reservoir valves 26 and 30, the leveling valves 42, 44, 46 and 48 and the discharge valves 58, 60, 64 and 66 based on the total pressure adjustment calculated at step 500.

The feedforward control, feedback control, calculation of the total pressure adjustment and the valve control are respectively explained in detail with reference to the flowcharts of FIGS. 6, 7, 8, 9A and 9B.

Figure 6:
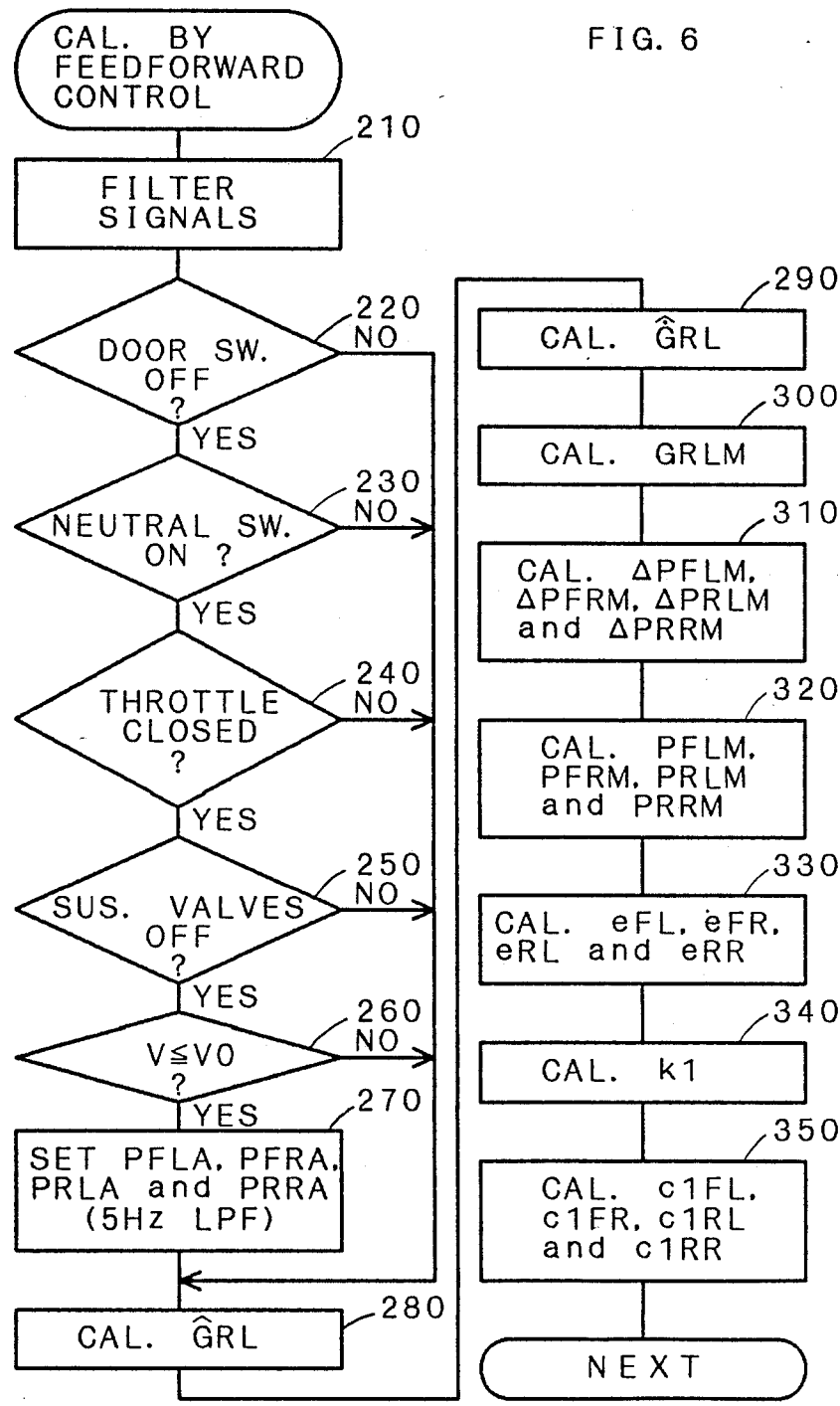
FIG. 6 is a flowchart of a feedforward calculation routine.

Set forth is an explanation of the feedforward control based on the flowchart of FIG. 6. As the first step of this routine, signals input from the sensors are filtered at step 210. A filtered output Y(n) is given by the following formula:

$$Y(n) = \{IF \cdot X(n) + (256 - IF) \cdot Y(n-1)\}/256,$$

in which X(n) is current data input, Y(n−1) is the prior filtered output, and IF is a filtering constant (varying from 1 through 256). By the filtering, noise and data fluctuations of a frequency higher than a preset threshold value can be diminished.

Subsequently, a series of determinations are executed for determining values of factors which will cause a change in the vehicle attitude. At step 220, it is determined by the door switches 94 whether all of the doors are closed. At step 230, it is determined by the neutral switch 95 whether the transmission is in the neutral position. At step 240, the throttle opening sensor 96 determines whether the throttle valve is completely shut. At step 250, it is determined whether the vehicle height control is now in effect. Namely, it is determined whether the suspension control valves such as the high pressure reservoir valves 26 and 30, the leveling valves 42, 44, 46 and 48 and the discharge valves 58, 60, 64 and 66 are in an OFF state. At step 260, it is determined by the speed sensor 93 whether the vehicle speed V is lower than a preset value V0. The purpose of the process steps 220, 230, 240 and 260 is to determine the values of factors which will cause a change in the vehicle attitude, e.g., opening/closing of the doors which indicate boarding of passengers, a shift position of the transmission indicating a transmission of power to the wheels, a suction air amount to the internal combustion engine representing the driving force of the vehicle, and the vehicle speed representing the driving state. The purpose of the process step 250 is to determine whether supplying/discharging of the air for controlling the pressures of the air springs 2FL, 2FR, 2RL and 2RR is not executed.

If all of the answers to the determination steps 220 through 260 are YES, it is assumed that the vehicle attitude is stable and that the pressures of the air springs 2FL, 2FR, 2RL and 2RR are not undergoing any remarkable change. In this case, the current values of the pressure sensors 50, 52, 54 and 56 are respectively stored in the RAM 106 as standard pressures PFLA, PFRA, PRLA and PRRA. The value of the filtering constant IF used at step 210 is set so that the standard pressures have values which are obtained from data filtered by a low pass filter with a threshold frequency (e.g., 5 Hz) lower than that used in the filtering executed at step 210.

On the other hand, if any one of the answers to steps 220 through 260 is NO, step 270 is not executed and the standard pressures PFLA, PFRA, PRLA and PRRA are not updated. Namely, under the condition that all of the answers at steps 220 through 260 are YES, the standard pressures PFLA, PFRA, PRLA and PRRA are updated each time.

Figure 10:
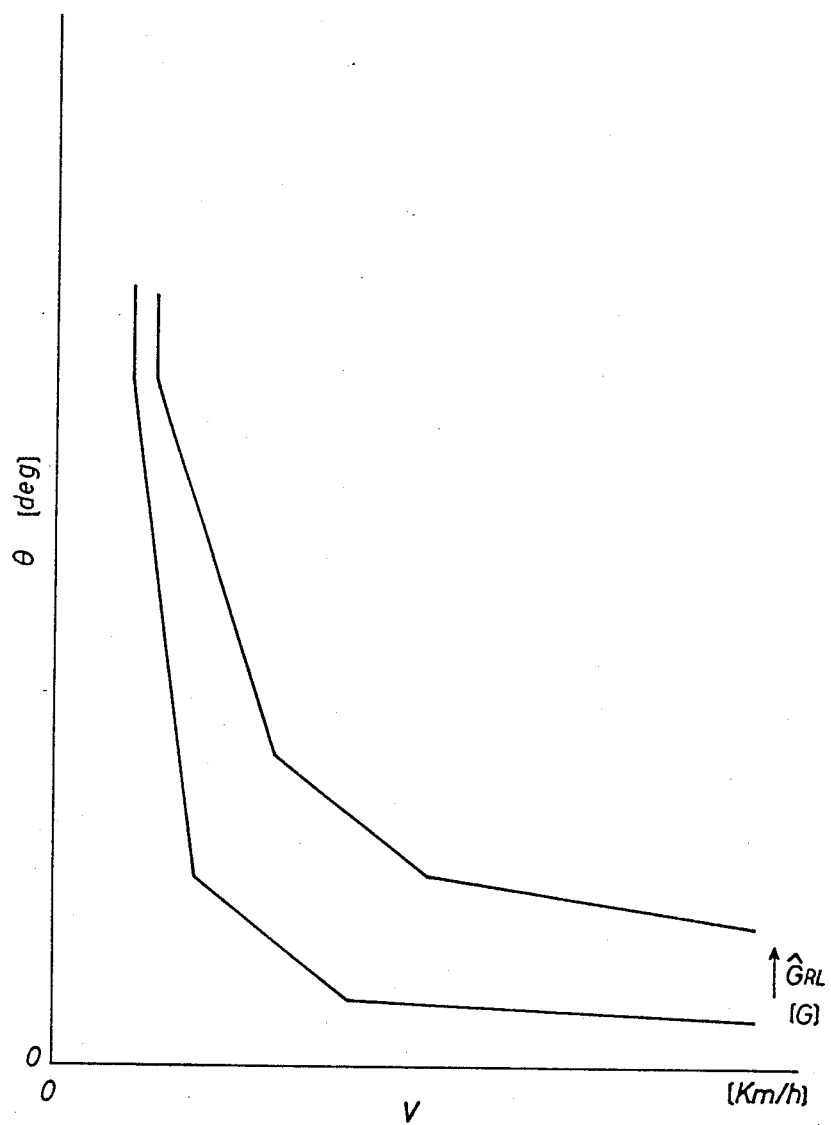
FIG. 10 is a graph showing a map for determining an estimated lateral acceleration GRL based on a steering angle $\theta$ and a vehicle speed V.

After step 270 or if any answer to process steps 220 through 260 is NO, the program proceeds to step 280 at which an estimated lateral acceleration GRL is determined based on a vehicle speed V and a steering angle $\theta$ with reference to the map of FIG. 10. Only two examples of different accelerations are shown in the map of FIG. 10, assuming that other cases also bear similar relations. The values of other accelerations can be calculated by an interpolation if necessary.

Figure 11:
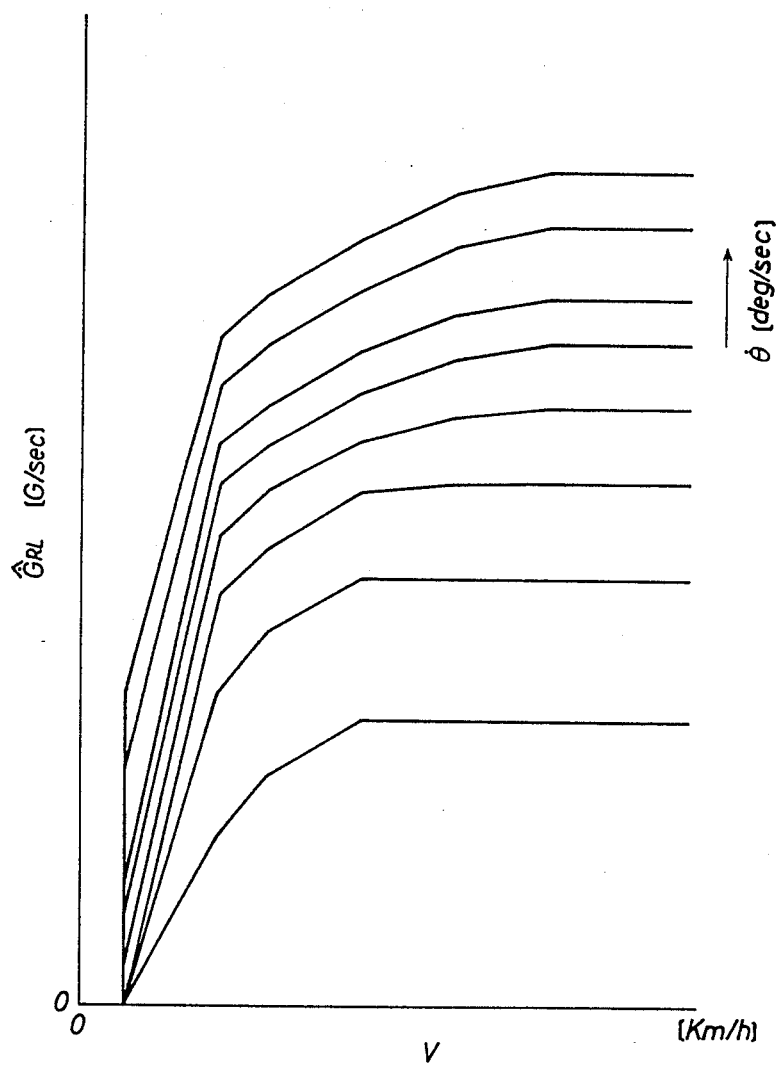
FIG. 11 is a graph showing a map for determining an estimated lateral accelerating rate GRL based on a steering angle speed $\theta$ and the vehicle speed V.

At step 290, an estimated lateral accelerating rate GRL is determined based on a relation between the vehicle speed V and a steering angle speed $\dot{\theta}$ which is a differential of the steering angle $\theta$, with reference to the map of FIG. 11. The steering angle speed $\dot{\theta}$ may be replaced with a change in the steering angle $\theta$ over a predetermined short period. FIG. 11 illustrates examples for eight different steering angle speeds $\dot{\theta}$. Other values can be obtained by the interpolation.

At subsequent step 300, an expected acceleration GRLM is calculated according to the following formula:

$$GRLM = m \cdot GRL + h \cdot \dot{GRL}, \text{ wherein}$$

m and h are constants having values determined by taking the responsiveness of the system into account. When the responsiveness of the system is low, the value of the constant h is made greater. But, as an excessively large value of h will introduce unstability in the system, the constants m and h are determined through prior experiments (e.g., m=1.0, h=0.1).

Figure 12:
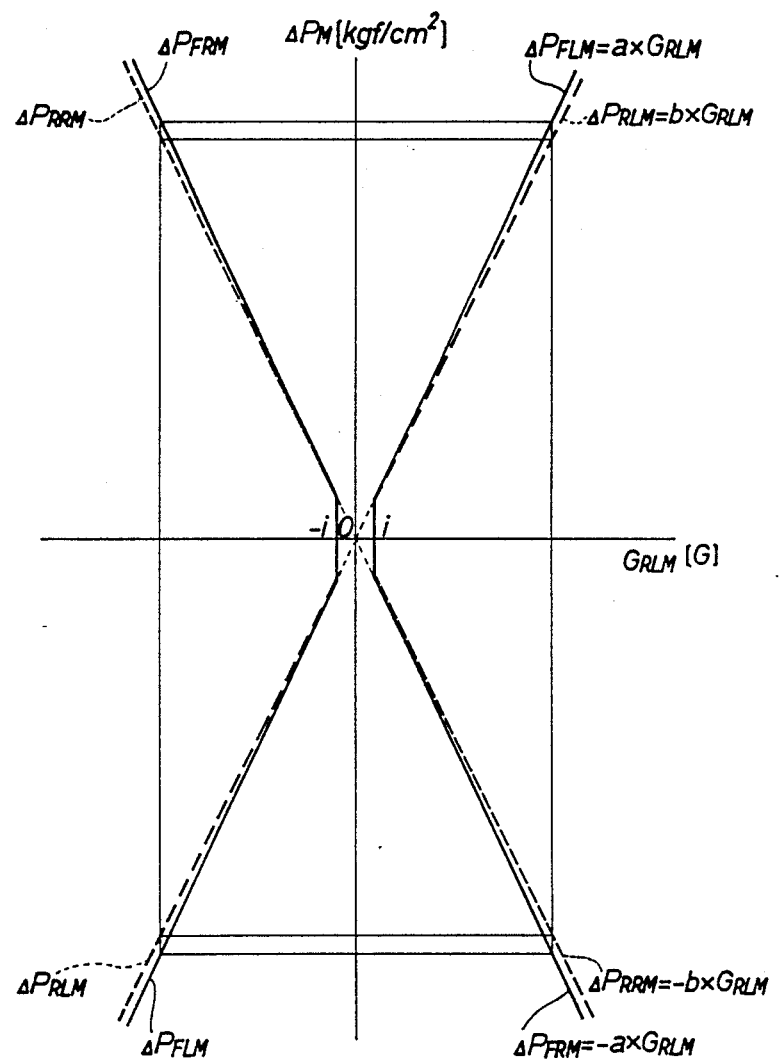
FIG. 12 is a graph showing a map for determining target pressure differences $\Delta PFLM$, $\Delta PFRM$, $\Delta PRLM$, $\Delta PRRM$ from an expected lateral acceleration GRLM.

At step 310, target pressure differences $\Delta PFLM$, $\Delta PFRM$, $\Delta PRLM$ and $\Delta PRRM$ of the air springs 2FL, 2FR, 2RL and 2RR of the suspensions 1FL, 1FR, 1RL and 1RR are calculated by utilizing the expected lateral acceleration GRLM with reference to the map of FIG. 12, in which the abscissa represents the expected lateral acceleration GRLM [G the unit equal to the gravitational acceleration GRLM] and the ordinate plots the target pressure difference [kgf/cm$^2$]. The target pressure differences $\Delta PFLM$, $\Delta PFRM$, $\Delta PRLM$ and $\Delta PRRM$ are determined as shown in the map of FIG. 12 and are also represented by formulas as follows:

$$\Delta PFLM = a \cdot GRLM,$$

$$\Delta PFRM = -a \cdot GRLM,$$

$$\Delta PRLM = b \cdot GRLM \text{ and}$$

$$\Delta PRRM = -b \cdot GRLM, \text{ wherein}$$

a and b are coefficients for compensating for the difference in the characteristics of individual suspensions. These coefficients a and b are given by the following formulas:

$$a = \{W \cdot h/(tf \cdot rf \cdot Af)\} \cdot \{(Lr/L) \cdot Kf\} \text{ and}$$

$$b = \{W \cdot h/(tr \cdot rr \cdot Ar)\} \cdot \{1 - (Lr/L) \cdot Kf\}, \text{ wherein}$$

W is the spring mass, h is the height of the center of gravity, tf is the front tread, tr is the rear tread, rf is the front arm ratio, rr is the rear arm ratio, Af is the front sustaining area, Ar is the rear sustaining area, L is the wheelbase and Lr is a distance between the rear axle and the center of gravity. The value of Kf is optionally set within a region of $(L/Lr) > Kf \geq 1.0$, and it represents a load allotment ratio of the front wheels. When Kf=1.0, the share of the load at the front is 50%. By optionally setting the value of Kf, the steering characteristic of the vehicle can be optionally set.

In order to avoid the repetition of minor adjustment due to a fluctuation of calculated values, detection errors, noises, and so on, an insensitive region i is set, whereby, when $-i \leq GRLM \leq i$, the target pressure differences $\Delta PFLM$, $\Delta PFRM$, $\Delta PRLM$ and $\Delta PRRM$ are all set at 0.

Subsequently, target pressures PFLM, PFRM, PRLM and PRRM are calculated at step 320 according to the following formulas:

$$PFLM = \Delta PFLM + PFLA,$$

PFRM=ΔPFRM+PFRA,

PRLM=ΔPRLM+PRLA and

PRRM=ΔPRRM+PRRA.

Thus, the pressure of individual air springs can be determined at a target value for controlling the vehicle attitude.

At step 330, individual pressure deviations eFL, eFR, eRL and eRR are calculated according to the following formulas:

eFL=PFLM−PFL, eFR=PFRM−PFR, eRL=PRLM−PRL and eRR=PRRM−PRR, wherein

PFL, PFR, PRL and PRR are pressure values obtained by filtering the outputs of the pressure sensors 50, 52, 54 and 56 provided for the main air chambers 4FL, 4FR, 4RL and 4RR of the suspensions 1FL, 1FR, 1RL and 1RR.

Figure 13:
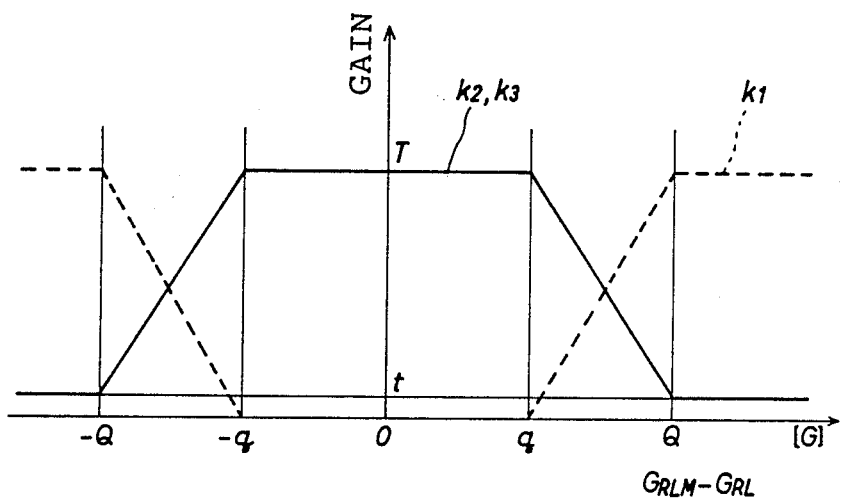
FIG. 13 is a graph showing a map for determining a feedforward gain k1 and feedback gains k2 and k3 based on the difference between the expected lateral acceleration GRLM and an actual lateral acceleration GRL.

In order to convert the pressure deviations into the control amount, a feedforward gain k1 representing a share of the feedforward control as the advance control is determined at step 340. The feedforward gain k1 is determined based on the difference between the expected lateral acceleration GRLM and the actual lateral acceleration GRL with reference to the dashed line shown in FIG. 13. The difference corresponds to the driving parameter of the share determination means. As shown in FIG. 13, when the difference |GRLM−GRL| is smaller than a preset value q, the value of k1 is set at 0. If |GRLM−GRL| is larger than a preset value Q (larger than q), k1 is set at T. For the region between q and Q, k1 is increased with the increase in |GRLM−GRL|. In the figure, k2 and k3 represents gains as a share of the feedback control which will be described later If the difference between the expected lateral acceleration GRLM and the current actual lateral acceleration GRL is large, it is expected that roll will occur. Accordingly, the share of the feedforward control in the actual control amount increases.

Subsequently, at step 350, feedforward pressure adjustments c1FL, c1FR, c1RL and c1RR to the respective suspensions 1FL, 1FR, 1RL and 1RR are calculated considering the share by utilizing the gain k1 and the pressure differences eFL, eFR, eRL and eRR according to the following formulas:

c1FL=k1·eFL, c1FR=k1·eFR, c1RL=k1·eRL and c1RR=k1·eRR.

Thus, the feedforward control is executed and the feedforward pressure adjustments c1FL, c1FR, c1RL and c1RR as the advance control amounts considering the share of the feedforward control are calculated.

Figure 7:
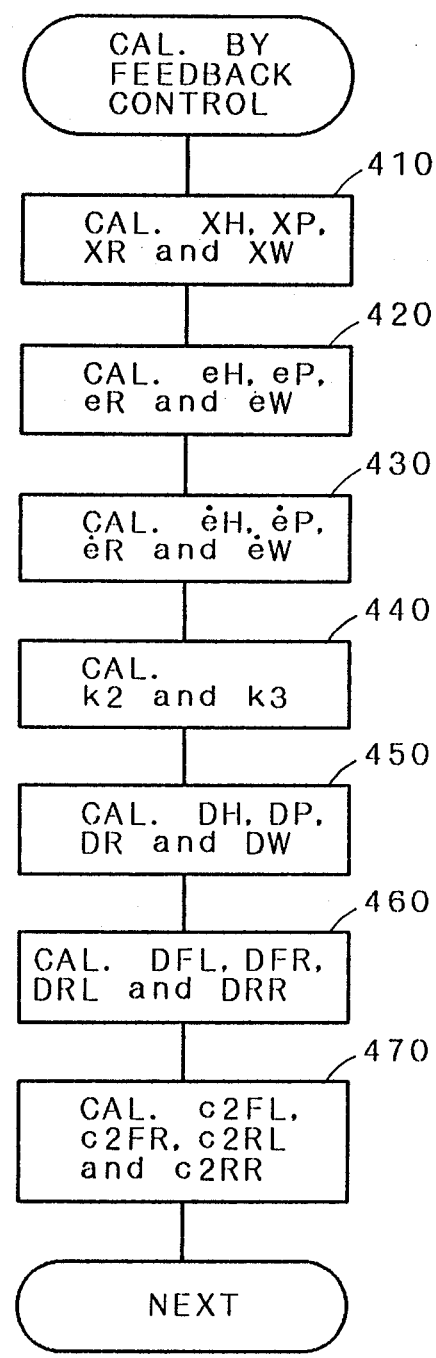
FIG. 7 is a flowchart of a feedback calculation routine.

Now, the feedback control process is explained with reference to the flowchart of FIG. 7. At step 410, a vertical translational displacement XH, a pitch displacement XP, a roll displacement XR and a warp displacement XW of the vehicle body are calculated in response to the output values XFL, XFR, XRL and XRR of the vehicle height sensors 80, 82, 84 and 86 provided for the suspensions 1FL, 1FR, 1RL and 1RR, according to the following formulas:

XH=(XFR+XFL)+(XRR+XRL),

XP=(XFR+XFL)−(XRR+XRL),

XR=(XFR−XFL)+(XRR−XRL) and

XW=(XFR−XFL)−(XRR−XRL), wherein

XFR, XFL, XRR and XRL respectively represent the front right vehicle height, front left vehicle height, rear right vehicle height and the rear left vehicle height.

Based on the above calculated displacements XH, XP, XR and XW, displacement deviations eH, eP, eR and eW for each displacement mode are calculated at step 420 in accordance with the following formulas:

eH=XHM−XH, eP=XPM−XP, eR=XRM−XR and eW=XWM−XW, wherein

Figure 14:
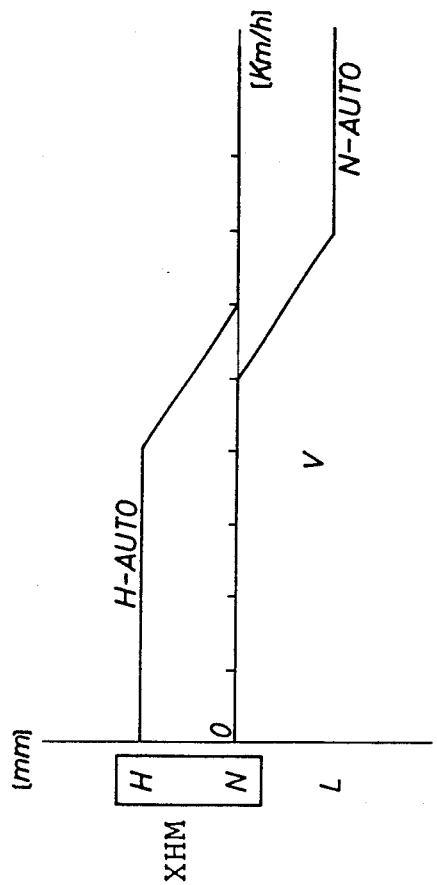
FIG. 14 is a graph showing a map for determining a target vertical translational displacement XHM based on the vehicle speed V and a vehicle height mode.
Figure 15:
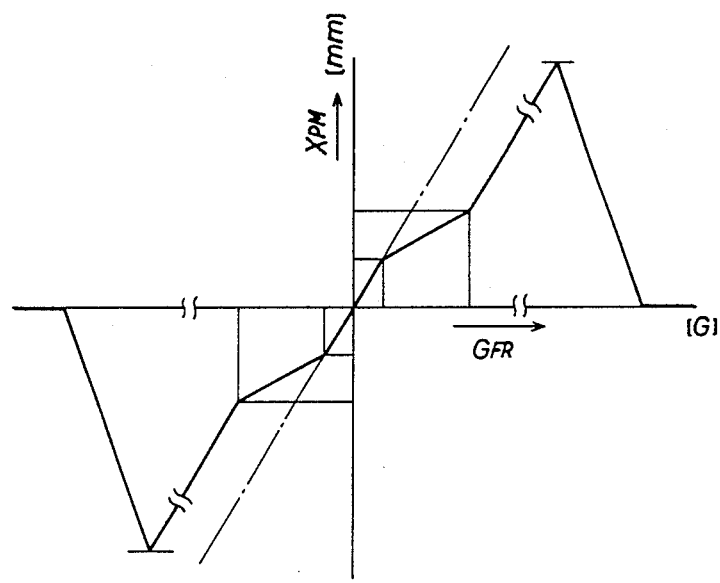
FIG. 15 is a graph showing a map for determining a target pitch displacement XPM from an actual longitudinal acceleration GFR.
Figure 16:
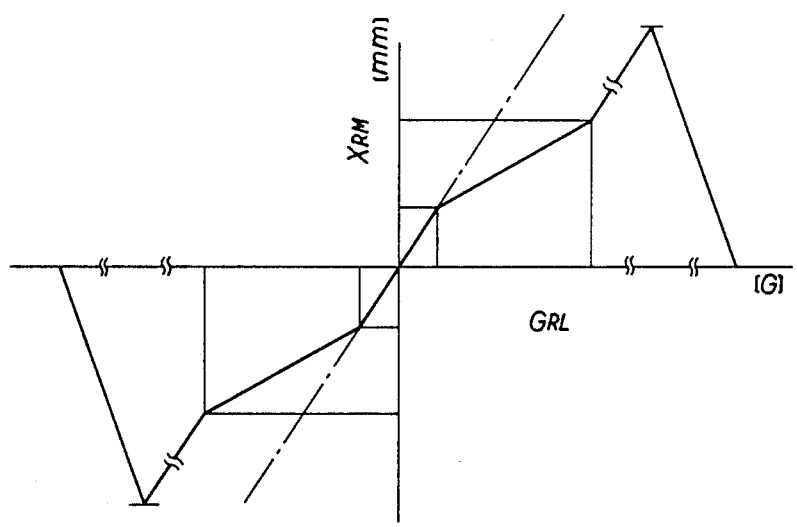
FIG. 16 is a graph showing a map for determining a target roll displacement XRM based on the actual lateral acceleration GRL.
Figure 17:
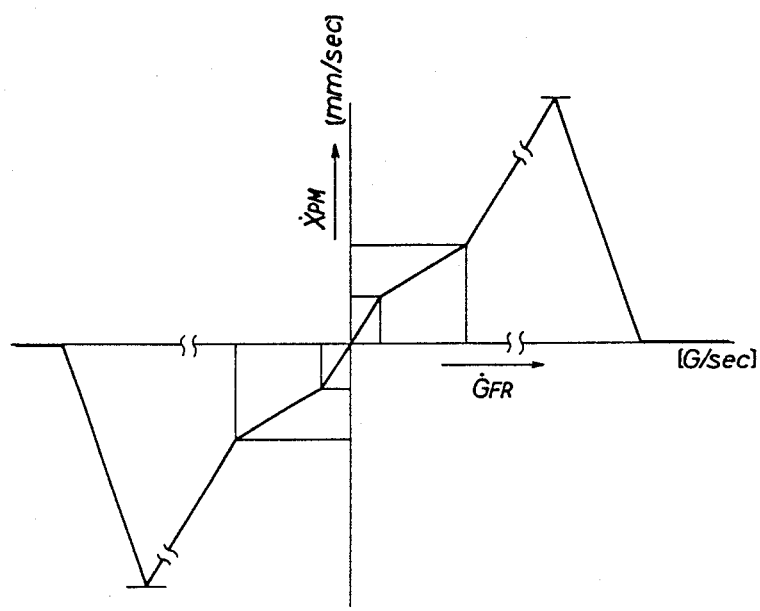
FIG. 17 is a graph showing a map for determining a target pitch displacement speed XPM based on an actual longitudinal accelerating rate GFR.
Figure 18:
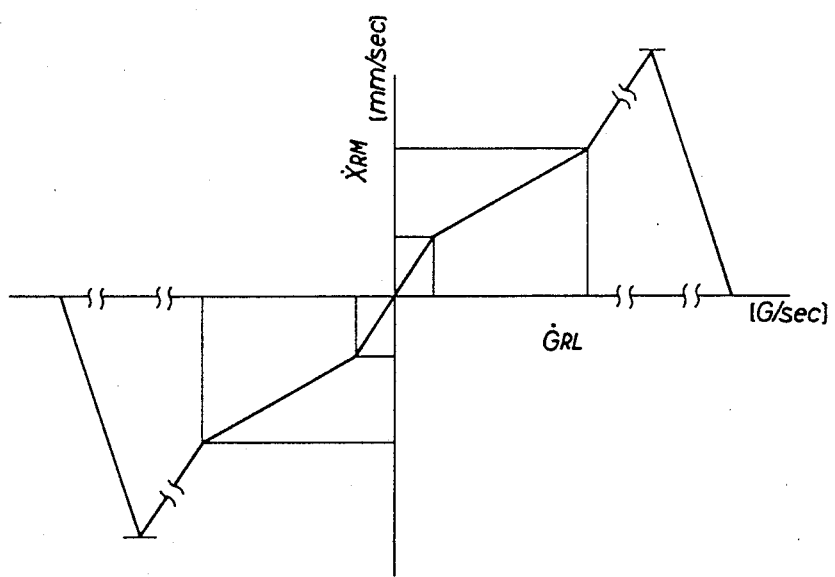
FIG. 18 is a graph showing a map for determining a target roll displacement speed XRM based on an actual accelerating rate GRL.

XHM represents a target vertical translational displacement which is determined from the vehicle speed V and a mode (H-AUTO or N-AUTO) selected by the high switch 97 or the low switch 98 as shown in the map of FIG. 14. XPM is a target pitch displacement which is determined from the actual longitudinal acceleration GFR detected by the acceleration sensor 92 based on the map of FIG. 15. XRM is a target roll displacement which is determined from the actual lateral acceleration GRL based on the map of FIG. 16. XWM is a target warp displacement which is normally set at 0.

By utilizing differentials XH, XP, XR and XW of the displacements XH, XP, XR and XW, speed deviations eH, eP, eR and eW for each mode are calculated at step 430 in accordance with the following formulas. The variables XH, XP, XR and XW may be replaced with differences of XH, XP, XR and XW during a predetermined short period.

eH=XHM−XH, eP=XPM−XP, eR=XRM−XR and eW=XWM−XW.

In the above formulas, XHM represents a target longitudinal translational displacement speed which is normally set at 0. XPM is a target pitch displacement speed which is determined from the longitudinal accelerating rate GFR based on the map of FIG. 17. XRM is a target roll displacement speed which is determined from the lateral accelerating rate GRL based on the map of FIG. 18. XWM is a target warp displacement speed which is normally set at 0.

In order to convert the individual displacements into the control amount, feedback gains k2H, k2P, k2R and k2W (which are represented by k2) and k3H, k3P, k3R, and k3W (represented by k3) are determined as the share of feedback control at step 440. Namely, the gains k2 and k3 are determined in response to the difference between the expected lateral acceleration GRLM and the actual lateral acceleration GRL with reference to the map shown by a solid line in FIG. 13. The difference corresponds to the driving parameter of the share determination means. As shown in FIG. 13, when the difference |GRLM−GRL| is smaller than the preset value q, k2 and k3 are set at T. If larger than the preset value Q, k2 and k3 are set at a small value t. For the region between q and Q, k2 and k3 decrease with the increase in |GRLM−GRL|. Accordingly, if the difference between the expected lateral acceleration GRLM and the actual lateral acceleration GRL is small, the share of the feedback control in the final control amount is increased because the attitude of the vehicle body is assumed to be stable.

Based on the deviations eH, eP, eR and eW and the deviation speeds eH, eP, eR and eW, feedback amounts DH, DP, DR and DW for the corresponding modes are calculated at step 450 considering the share of the control in accordance with the following formulas:

$$DH = k2H \cdot eH + k3H \cdot eH + k4H,$$

$$DP = k2P \cdot eP + k3P \cdot eP + k4P,$$

$$DR = k2R \cdot eR + k3R \cdot eR + k4R \text{ and}$$

$$DW = k2W \cdot eW + k3W \cdot eW + k4W, \text{ wherein}$$

k2H, k2P, k2R, k2W, k3H, k3P, k3R and k3W are constants determined by taking account of the responsiveness of the system (e.g., k2H, k2P, k2R, k2W = 0.5; k3H, k3P, k3R, k3W = 0.3). k4H, k4P, k4R and k4W are also preset constants for compensating hardware configuration of the system (e.g., the difference in the length of the air pipes between left and right or between front and rear), and may be all set at 0.

By utilizing the feedback amounts DH, DP, DR and DW for the individual modes, feedback control amounts DFL, DFR, DRL and DRR for the suspensions 1FL, 1FR, 1RL and 1RR are calculated in accordance with the following formulas:

$$DFL = (\tfrac{1}{4})(kOH \cdot DH + 2kOP \cdot Lf \cdot DP - kOR \cdot DR - kOW \cdot DW),$$

$$DFR = (\tfrac{1}{4})(kOH \cdot DH + 2kOP \cdot Lf \cdot DP + kOR \cdot DR + kOW \cdot DW),$$

$$DRL = (\tfrac{1}{4})(kOH \cdot DH - 2kOP \cdot (1 - Lf) \cdot DP - kOR \cdot DR + kOW \cdot DW)$$

and $$DRR = (\tfrac{1}{4})(kOH \cdot DH - 2kOP \cdot (1 - Lf) \cdot DP + kOR \cdot DR - kOW \cdot DW)$$

In the above formulas, kOH, kOP, kOR and KOW are control gains for heave (translational movement), pitch, roll and warp, respectively, and are determined from design policy. When kOP and kOR are set at larger values, pitch and roll can be suppressed but in usual cases they may be all set at 1. Lf represents a load allotment ratio between the front and rear axles determined by considering the position of the center of gravity within the wheelbase.

At step 470, feedback pressure adjustments c2FL, c2FR, c2RL and c2RR are calculated by utilizing the feedback amounts DFL, DFR, DRL and DRR in accordance with the following formulas:

$$c2FL = PFL \cdot a2FL \cdot DFL,$$

$$c2FR = PFR \cdot a2FR \cdot DFR,$$

$$c2RL = PRL \cdot a2RL \cdot DRL \text{ and}$$

$$c2RR = PRR \cdot a2RR \cdot DRR, \text{ wherein}$$

PFL, PFR, PRL and PRR are obtained by filtering the outputs of the pressure sensors 50, 52, 54 and 56 provided for the main air chambers 4FL, 4FR, 4RL and 4RR of the suspensions 1FL, 1FR, 1RL and 1RR. a2FL, a2FR, a2RL and a2RR are predetermined coefficients.

Thus, the feedback control process is executed and the feedback pressure adjustments c2FL, c2FR, c2RL and c2RR as the feedback control amounts considering the share of the control are calculated.

Figure 8:
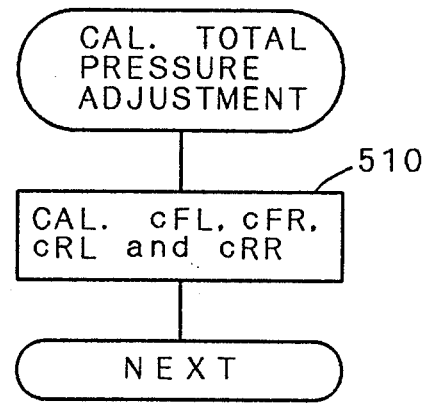
FIG. 8 is a flowchart of a total pressure adjustment calculation routine.

Subsequently, the calculation of the total pressure adjustment is executed at step 510 in the flowchart of FIG. 8. Total pressure adjustments cFL, cFR, cRL and cRR for controlling the vehicle attitude are calculated by adding the feedforward pressure adjustments c1FL, c1FR, c1RL and c1RR and the feedback pressure adjustments c2FL, c2FR, c2RL and c2RR, as follows:

$$cFL = c1FL + c2FL,$$

$$cFR = c1FR + c2FR,$$

$$cRL = c1RL + c2RL \text{ and}$$

$$cRR = c1RR + c2RR.$$

Set forth is the explanation of the valve controls for controlling air flow to/from the main air chambers 4FL, 4FR, 4RL and 4RR of the suspensions 1FL, 1FR, 1RL and 1RR. Reference is now made to the flowchart of FIG. 9A.

In order to adjust the pressures of the main air chambers 4FL, 4FR, 4RL and 4RR based on the total pressure adjustments cFL, cFR, cRL and cRR, VALVE-ON intervals tFL, tFR, tRL and tRR for the high pressure reservoir valves 26 and 30, the leveling valves 42, 44, 46 and 48 or the discharge valves 58, 60, 64 and 66 are calculated in accordance with the following formulas.

When the high pressure reservoir valves 26 and 30 and the leveling valves 42, 44, 46 and 48 are in the ON state, namely, when the pressures are increasing, $$tFL = (aF/\emptyset) \cdot (cFL/PFH),$$

$$tFR = (aF/\emptyset) \cdot (cFR/PFH),$$

$$tRL = (aR/\emptyset) \cdot (cRL/PRH) \text{ and}$$

$$tRR = (aR/\emptyset) \cdot (cRR/PRH);$$

when the discharge valves 58, 60, 64 and 66 are in the ON state, namely, when the pressures are decreasing, $$tFL = (bF/\emptyset) \cdot (cFL/PFL),$$

$$tFR = (bF/\emptyset) \cdot (cFR/PFR),$$

$$tRL = (bR/\emptyset) \cdot (cRL/PRL) \text{ and}$$

tRR=(bR/∅)·(cRR/PRR).

Figure 19:
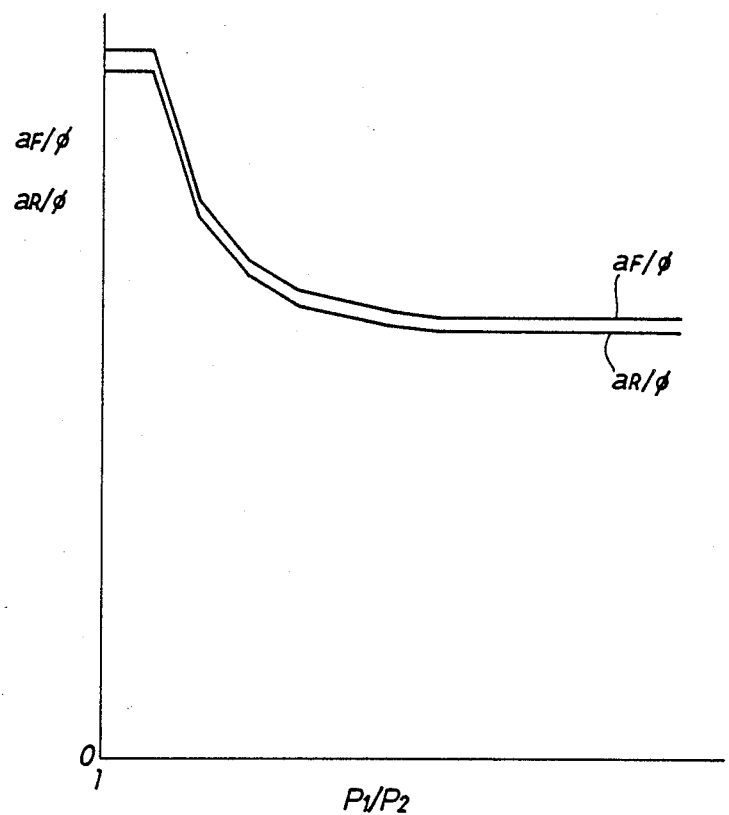
FIG. 19 is a graph showing a map for determining coefficients aF/∅ and aR/∅ based on a ratio P1/P2, i.e., the ratio of a high pressure tank pressure P1 to a pressure P2 of a main air chamber receiving air supply from the high pressure tank.
Figure 20:
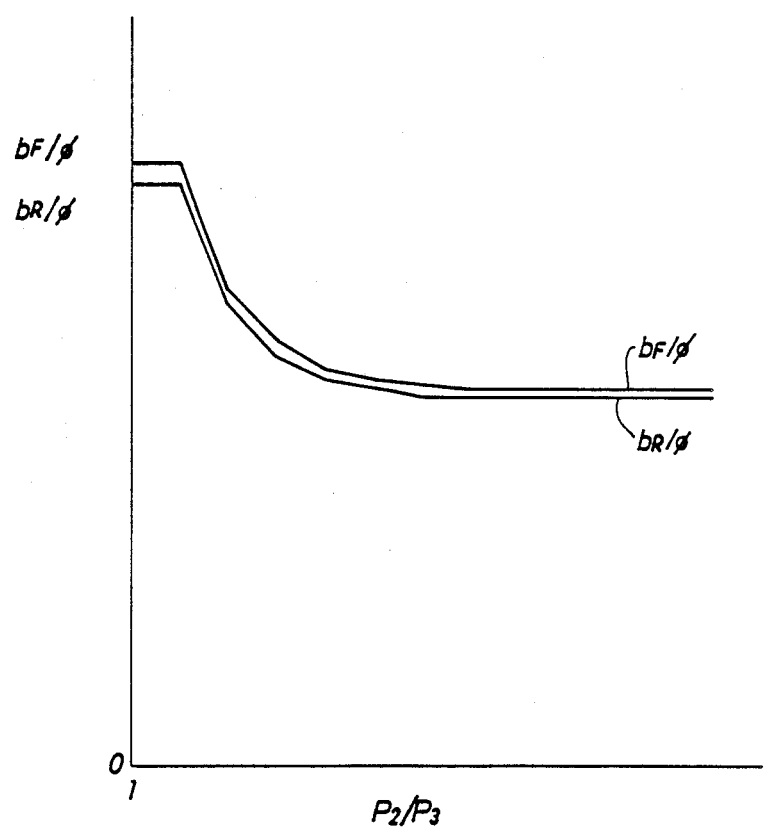
FIG. 20 is a graph showing a map for determining coefficients bF/∅ and bR/∅ based on a ratio P2/P3, i.e., a ratio of the main air chamber pressure P2 to a pressure P3 of a low pressure tank receiving air discharge from the main air chamber.

In the above formulas, aF/∅ and aR/∅ are determined from a ratio P1/P2, i.e., the ratio of the high-pressure tank pressure P1 (=PFH or PRH) to the pressure P2 of the main air chamber receiving the air supply from the high pressure tank, with reference to the map of FIG. 19. The high pressure tank is the front high pressure reserve tank 28 or the rear high pressure reserve tank 30. The pressures PFH and PRH respectively indicate the pressures of the tanks 28 and 31. In the similar manner, bF/∅ and bR/∅ are determined from a ratio P2/P3, i.e., the ratio of the main air chamber pressure P2 to the pressure P3 of the low pressure tank receiving the air discharge from the main air chambers, with reference to the map of FIG. 20. The low pressure tank is the front low pressure reserve tank 62 or the rear low pressure reserve tank 68.

At subsequent step 620, correction of the VALVE-ON interval is executed. Namely, valve energizing time intervals tFLU, tFRU, tRLU and tRRU (tFLD, tFRD, tRLD and tRRD) are calculated based on the VALVE-ON intervals tFL, tFR, tRL and tRR according to the following formulas.

When the high pressure reservoir valves 26 and 30 and the leveling valves 42, 44, 46 and 48 are ON, i.e., when the pressures are increasing, tFLU=αF·tFL+βFL, tFRU=αF·tFR+βFR, tRLU=αR·tRL+βRL and tRRU=αR·tRR+βRR.

When the discharge valves 58, 60, 64 and 66 are ON, i.e., when the pressures are decreasing, tFLD=γF·tFL+δFL, tFRD=γF·tFR+δFR, tRLD=γR·tRL+δRL and tRRD=γR·tRR+δRR.

In the above formulas, αF, γF, αR γR are coefficients determined by taking following factors into account: valve characteristics, length of pipes, environmental temperature of the valves (e.g., engine room temperature), etc. They may be all set at 1. βFL, βFR, βRL βRR, δFL, δFR, δRL and δRR are difference of the time intervals needed to open and close the valves. For example, when a valve needs 30 msec to open and 10 msec to close, those values are set at 20 [msec].

Figure 21A:
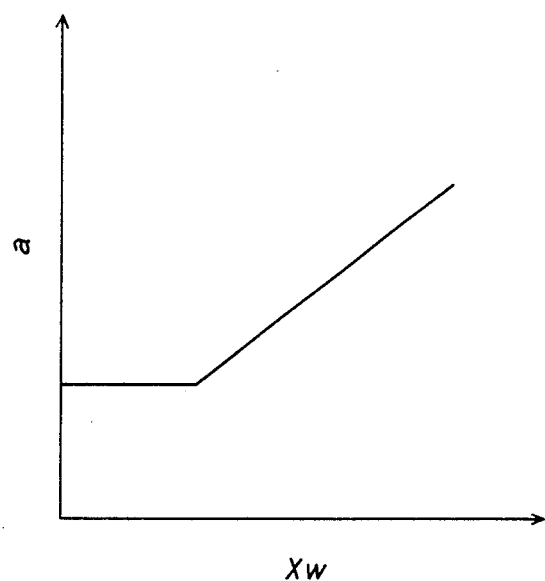
FIG. 21A is a graph showing a map for determining an insensitive region a based on a warp displacement XW.
Figure 21B:
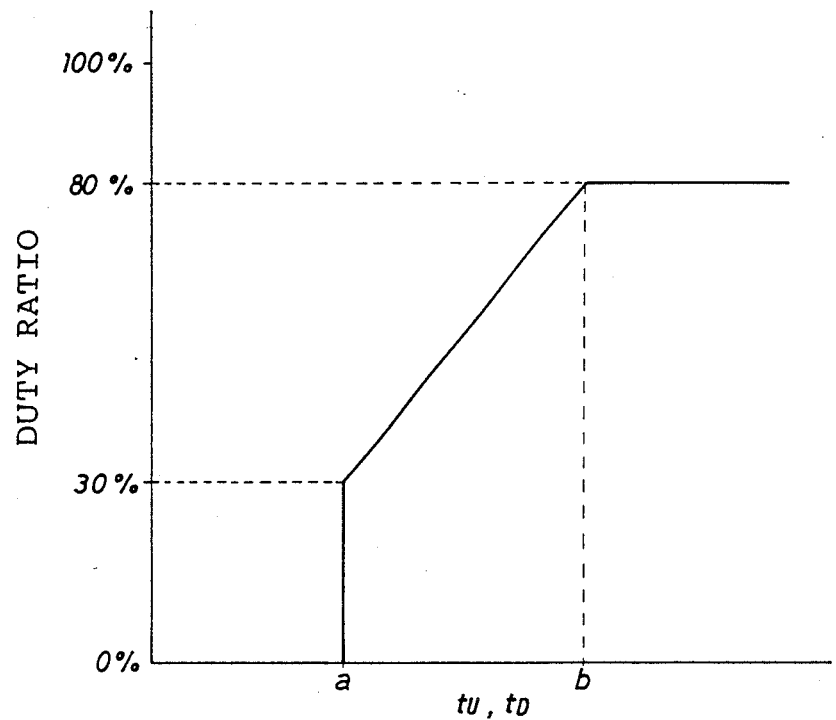
FIGS. 21B and 21C are graphs showing maps for determining a duty ratio based on a calculated valve energizing time interval tU or tD.

At step 630, guarding of the valve energizing times tFLU, tFRU, tRLU and tRRU (represented by tU) and tFLD, tFRD, tRLD and tRRD (represented by tD) is executed. Namely, the length of an insensitive region a is determined with reference to the graph of FIG. 21A by the warp displacement XW calculated at step 410. In response to the insensitive region a, in other words, the valve energizing time interval tU or tD, a minimum value of a duty ratio of the energizing signal of the electro-magnetic air valves is determined. For example, during rough-road driving, the insensitive region a is set so as to avoid excessively frequent actions of the control valves. As shown in FIG. 21B, the valve energizing time tU or tD and the duty ratio have a rectilinear relation within the region a ≦tU, tD≦b. When the calculated valve energizing time tU or tD is less than a, the duty ratio is set at 0. When the valve energizing time is very short, the flow amount becomes non-linear with time so that accurate pressure control cannot be executed. To cope with this, the length of the insensitive region a is set at a value larger than the energizing time having the above-mentioned non-linear flow characteristic.

When the calculated valve energizing time tU or tD is within the insensitive region a, the duty ratio is set at 0 and the individual control valves are not energized. If tU or tD exceeds the upper preset time interval b, the duty ratio is fixed at 80%.

Figure 21C:
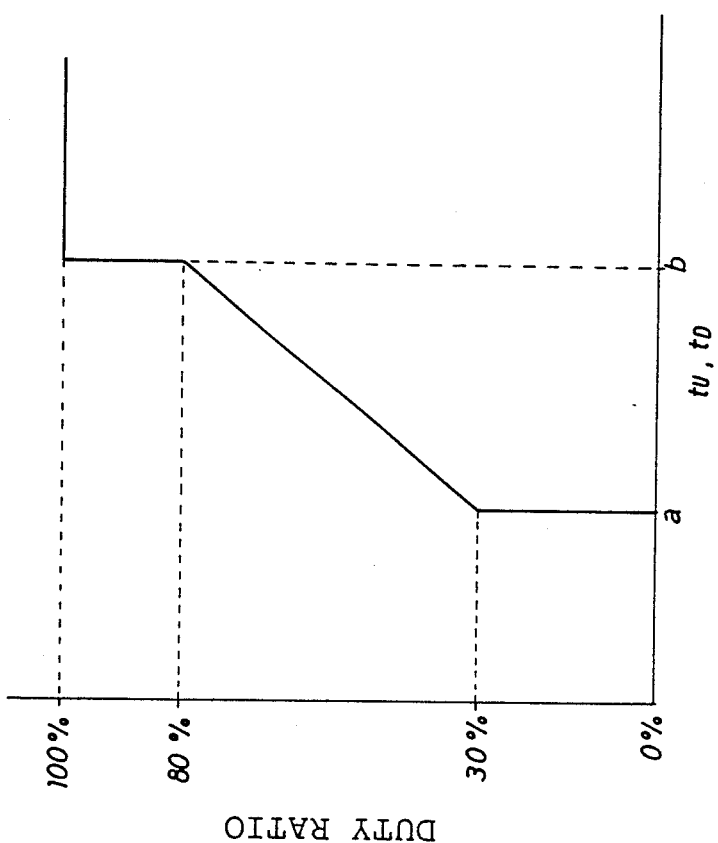

The duty ratio can be obtained based on the graph of FIG. 21C instead of FIG. 21B. According to FIG. 21C, if the calculated valve energizing time interval tU or tD exceeds a predetermined upper value b, the duty ratio is fixed at 100%. Thereby the frequency of opening/closing the valves is decreased so that the durability of the valves can be improved.

At step 640, valve energizing signals for pertinent valves among the air valves 26, 30, 42, 44, 46, 48, 58, 60, 64 and 66 are prepared in response to the guarded valve energizing time interval tU or tD.

Figure 9A:
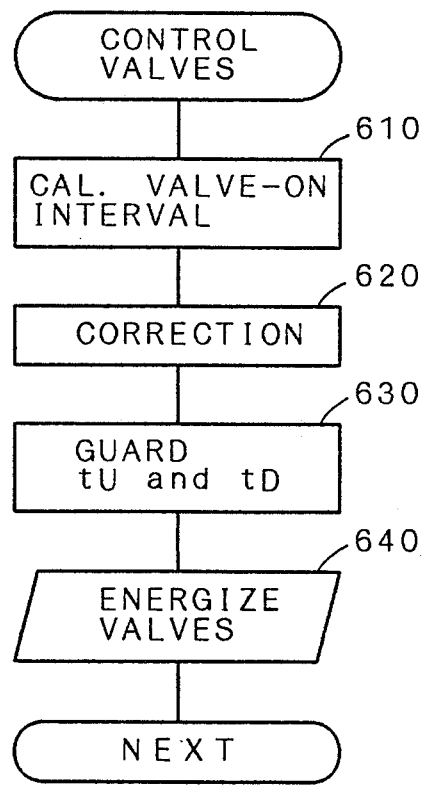
FIG. 9A is a flowchart of a valve control routine.
Figure 9B:
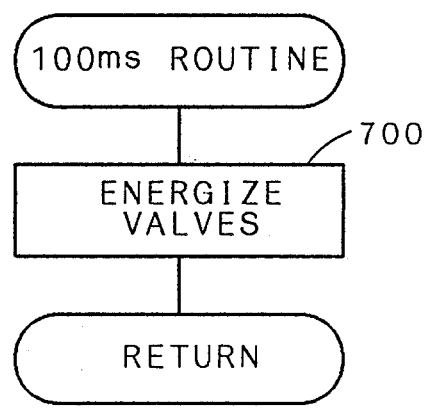
FIG. 9B is a flowchart of a valve energization routine.

After step 640, the present routine for calculating the air suspension control amount is once concluded. Upon restarting the above-mentioned calculation routine after the preset time interval, the determination of step 103 is made negative and the program proceeds to step 110. Thereafter, the same processes as the preceding ones resume. In the present embodiment, the valve controlling cycle time interval based on the above-mentioned duty ratio is 100 msec. Namely, the valves 26, 30, 42, 44, 46, 58, 60, 64 and 66 are duty controlled within this 100 msec interval, which is longer than the cycle time (8 msec) of the calculation routine. As shown by the flowchart of FIG. 9B, the valves 26, 30, 42, 44, 46, 48, 58, 60, 64 and 66 are duty controlled every 100 msec at step 700 according to the latest value of the valve energizing time which is determined at step 640.

In the present embodiment, the individual target pressures PFLM, PFRM, PRLM and PRRM are repeatedly calculated at every predetermined short time interval, and the pressures of the main air chambers 4FL, 4FR, 4RL and 4RR of the suspensions 1FL, 1FR, 1RL and 1RR are actually controlled at every predetermined time interval (for example, 100 msec) in response to the above-mentioned target pressures. As a result, smooth control of the pressures corresponding to the actual change during rolling can be realized so that ride comfort, maneuverability and stability of the vehicle are improved.

Figure 22A:
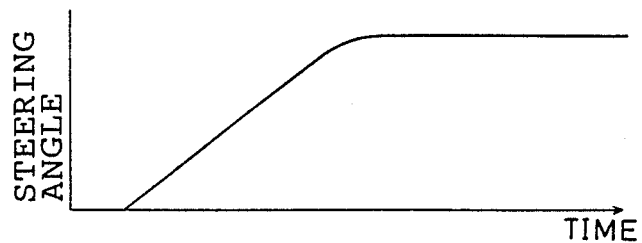
FIGS. 22A, 22B, 22C, 22D and 22E are timing charts indicating effects of the embodiment.
Figure 22B:
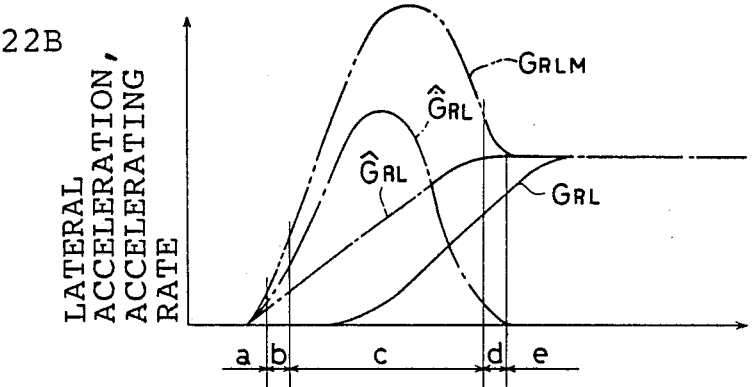

When the steering wheel is gently operated as shown in FIG. 22A, a difference between the expected lateral acceleration GRLM (two-dot chain line) and the actual lateral acceleration GRL (solid line) results a shown in FIG. 22B. In the region a indicating the initial steering state shown in FIG. 22B (representing the condition that the absolute value of the difference between the expected lateral acceleration GRLM and the actual lateral acceleration GRL is smaller than the preset value q (|GRLM−GRL|≦q)), feedback control is exclusively executed. Namely, the gain k1 is set at 0, k2 at T and k3 at T, assuming that the vehicle attitude is still stable. In the region b of FIG. 22B, i.e., under the condition that the absolute value of the difference

|GRLM −GRL| is in the region between q and Q (q<|GRLM−GRL|≦Q), roll is expected to occur. In this case, it is required to smoothly switch the feedback control to the feedforward control. To realize smooth switching, a transitional region is provided in which both the feedforward and the feedback controls are performed by increasing k1 according to the increase in |GRLM−GRL| and by decreasing k2 and k3 with the decrease in |GRLM−GRL|. In the region c (representing the condition that the difference |GRLM−GRL| is greater than Q), roll is expected to occur. In this case, mainly the feedforward control is executed by setting k1 at the large value T, and k2 and k3 at the small value t. In the region d where the steering angle change is almost zero, i.e., when |GRLM−GRL| is in the region between q and Q, the vehicle attitude is expected to stabilize. In order to smoothly switch feedforward control to feedback control, a transitional region is provided in which both feedforward control and feedback control are performed by increasing k1 according to the increase in |GRLM−GRL|, and by decreasing k2 and k3 with the decrease in |GRLM−GRL|. In the region e in which the steering angle is fixed, i.e., when |GRLM−GRL| is smaller than q, k1 is set at 0, and k2 and k3 are set at T, regarding that the vehicle attitude is stable.

Figure 22C:
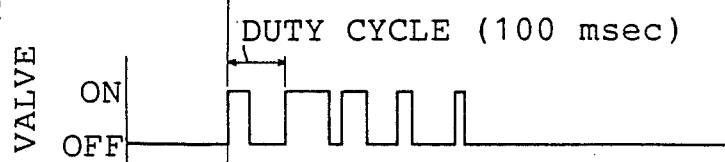
Figure 22D:
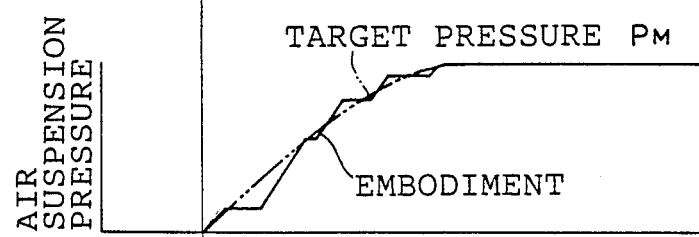
Figure 22E:
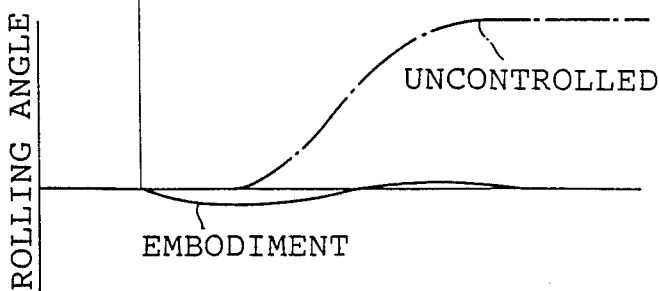
Figure 23:
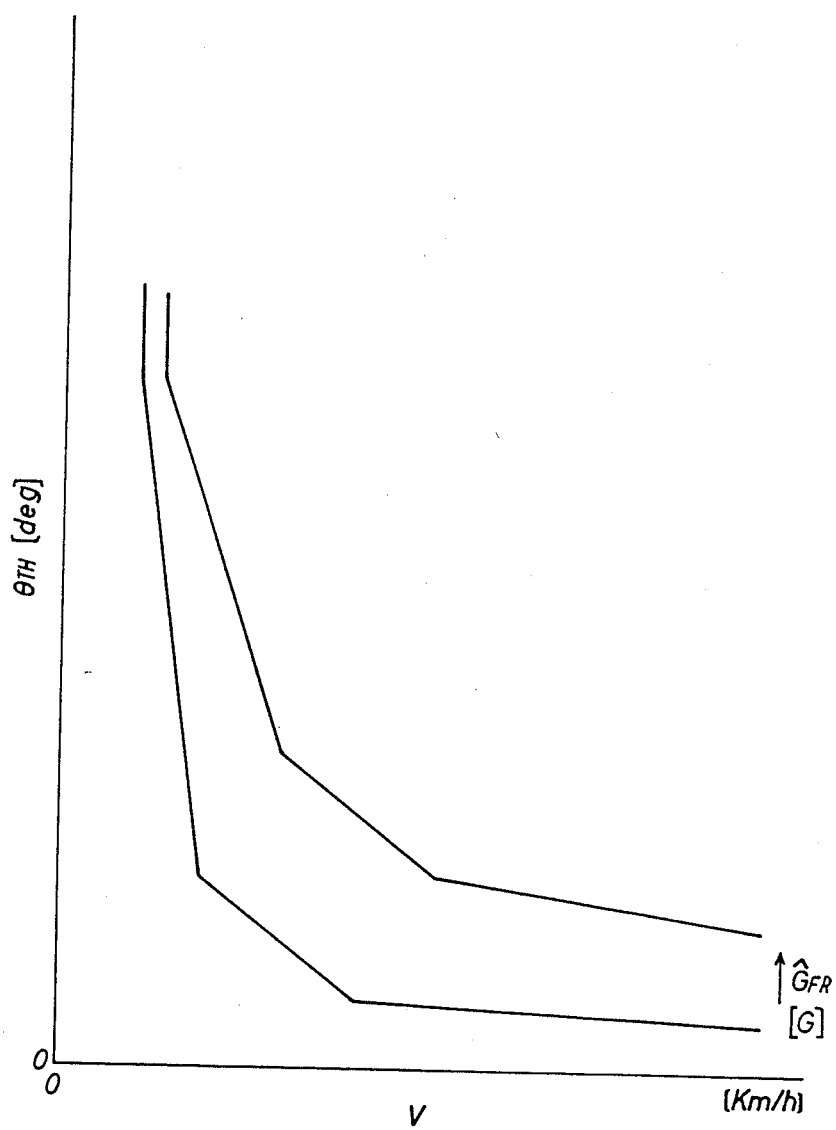
FIG. 23 is a graph showing a map for determining the estimated longitudinal acceleration GFR based on a throttle opening θTH and the vehicle speed V.
Figure 24:
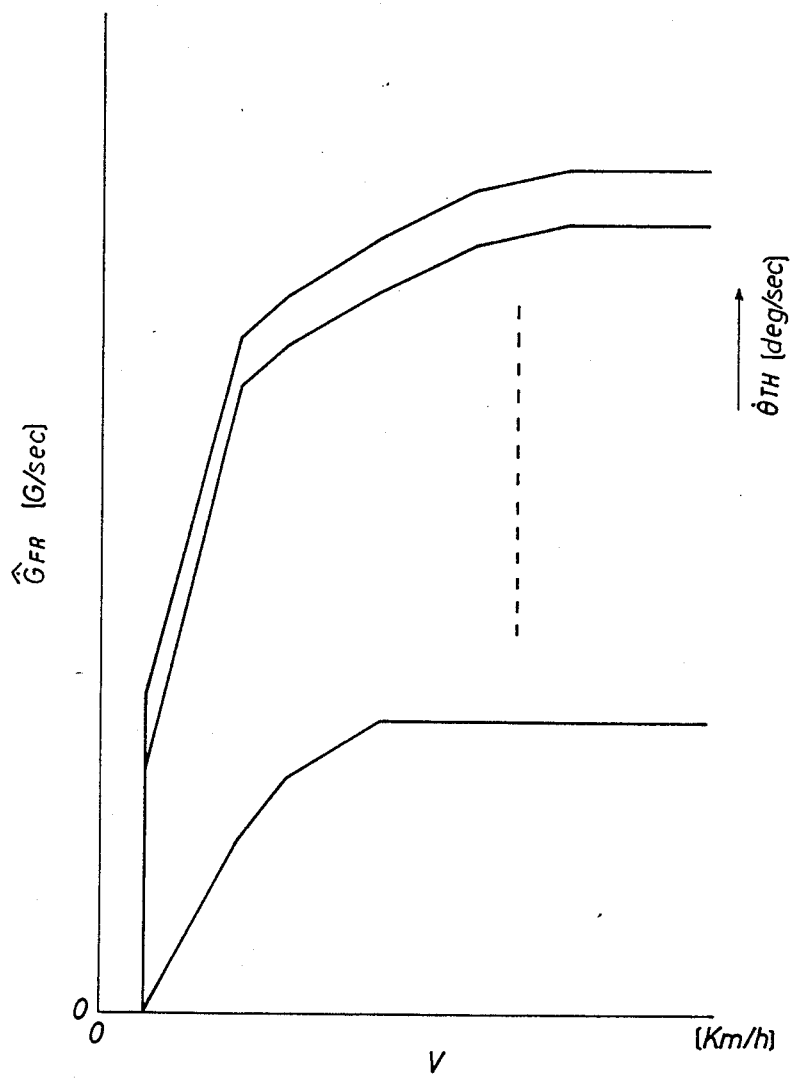
FIG. 24 is a graph showing a map for determining the estimated longitudinal accelerating rate GFR based on a throttle opening speed θTH and the vehicle speed V.
Figure 25:
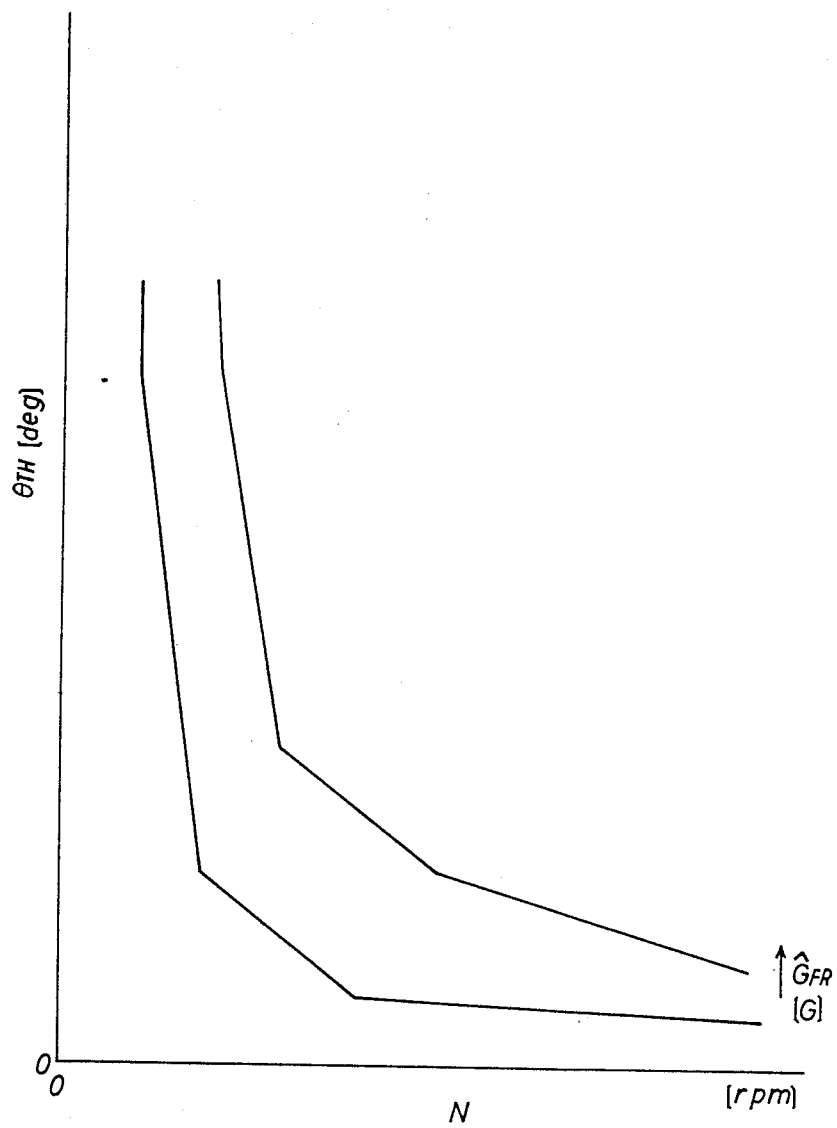
FIG. 25 is a graph showing a map for determining the estimated longitudinal acceleration GFR based on the throttle opening θTH and a rotational speed N of an internal combustion engine.
Figure 26:
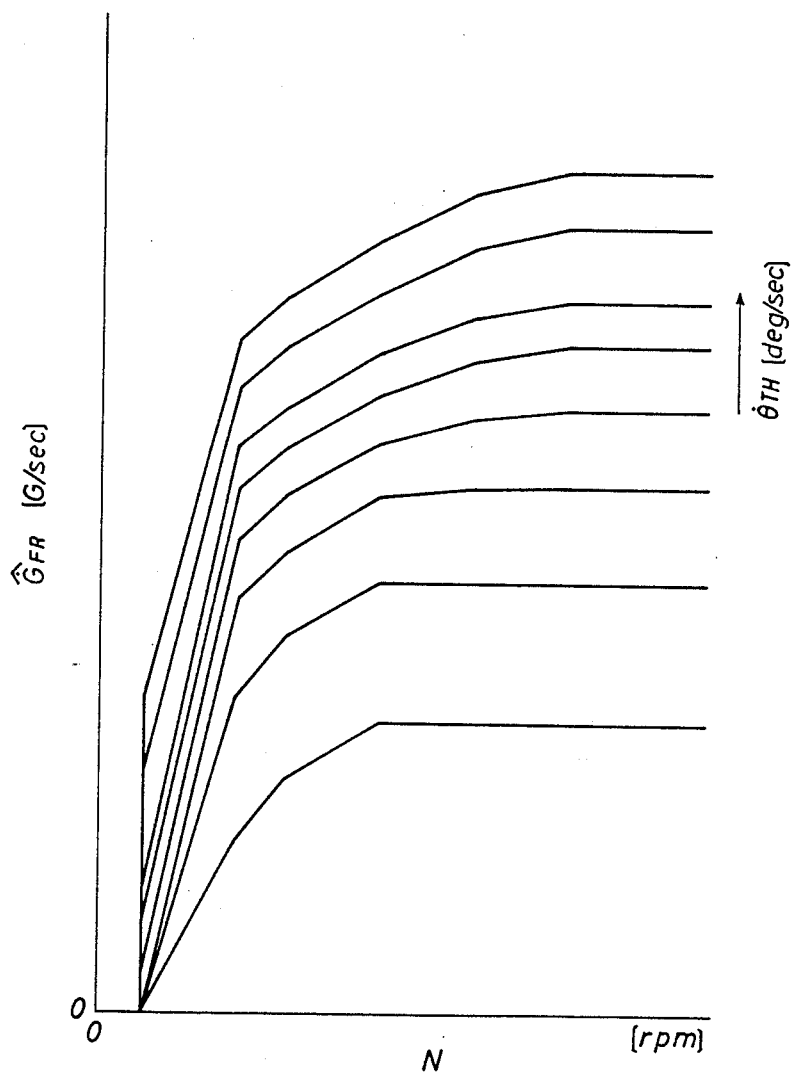
FIG. 26 is a graph showing a map for determining the estimated longitudinal accelerating rate GFR based on the throttle opening speed θTH and the engine speed N.
Figure 27:
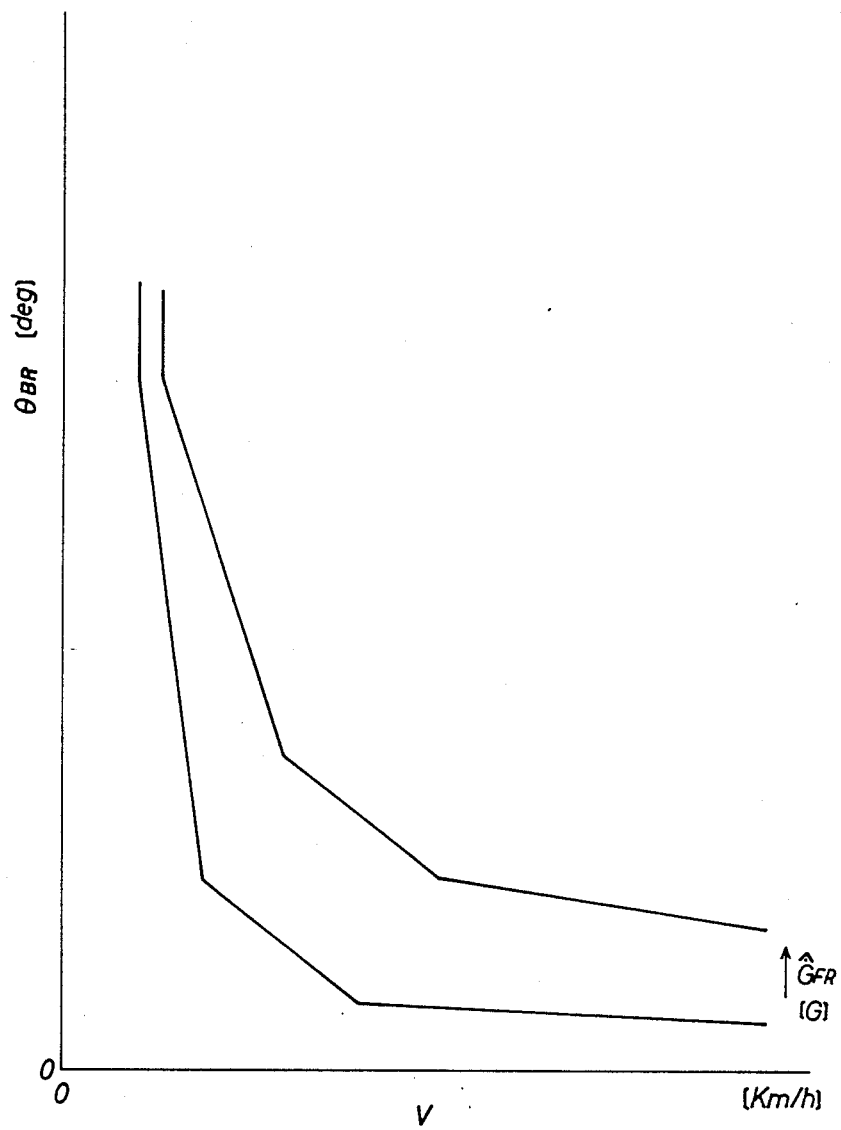
FIG. 27 is a graph showing a map for determining the estimated longitudinal acceleration GFR based on a brake pedal displacement θBR and the vehicle speed V.
Figure 28:
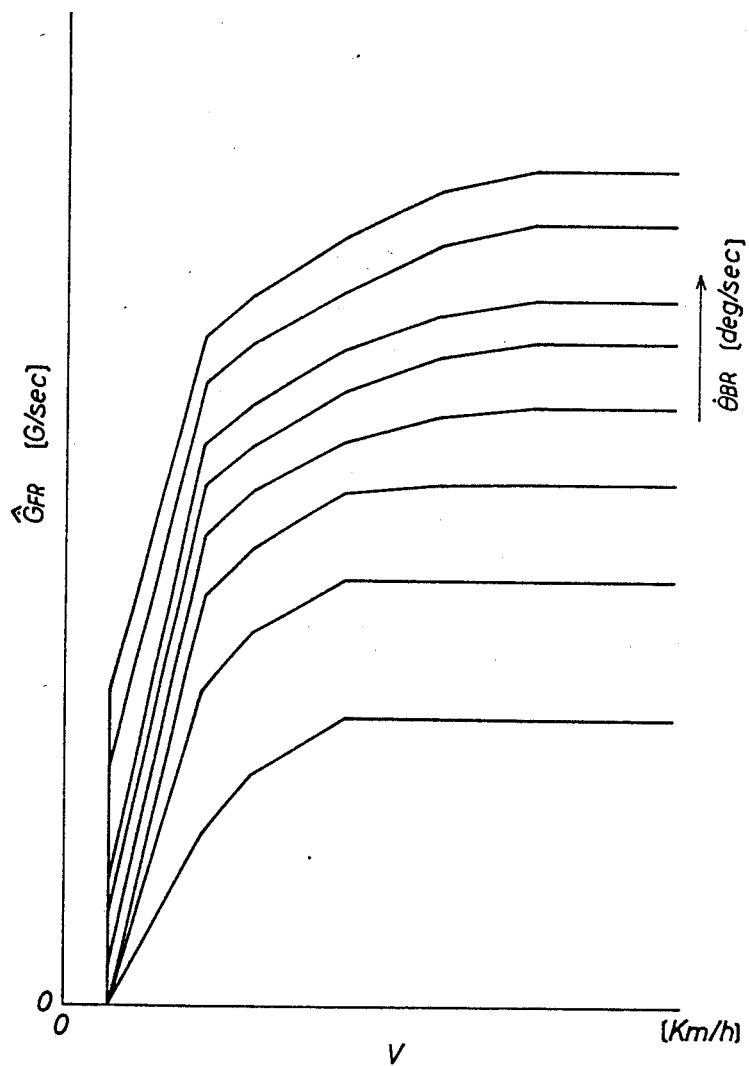
FIG. 28 is a graph showing a map for determining the estimated longitudinal accelerating rate GFR based on a braking speed θBR and the vehicle speed V.

FIG. 22C shows that the valve energizing signal fed to an appropriate valve has the cycle time of 100 msec with its duty ratio varying every cycle time according to the calculation results explained so far. As shown in FIG. 22D, the pressures of the main air chambers 4FL, 4FR, 4RL and 4RR of the suspensions 1FL, 1FR, 1RL and 1RR are gradually increased in response to the increase in the expected lateral acceleration GRLM. As a result, the roll angle can be minimized as shown in FIG. 22E so that maneuverability and stability of the vehicle are improved.

On the other hand, when the calculated valve energizing time tU or tD is within the insensitive region a, opening/closing of the valves is not executed. Since a frequent opening/closing of the valves is prevented, the durability of the valves can be improved. If the valves are controlled with a small duty ratio, flow control cannot be accurately executed because the valves have a non-linear flow characteristic. In the present embodiment, since opening/closing of the valves is not carried out when the calculated valve energizing time tU or tD is within the insensitive region a, the accuracy in the attitude control can be improved. Moreover, since supplying/discharging of the air to/from the individual reserve tanks 28, 32, 62 and 68 is not executed, the energy consumption can be minimized. As a result, maneuverability and stability of the vehicle can be improved.

If the vehicle stops with one of the wheels riding on a corner stone or dropping in a dip, the value of the warp displacement XW becomes large. In this case, the insensitive region a expands according to the map of FIG. 21A and the duty ratio is set at 0 so that unnecessary attitude control is not executed by energizing the valves. Also for a rough-road running, the warp displacement XW becomes large and the insensitive region a is set at a large value. Accordingly, if the calculated valve energizing time tU or tD is a small value, the valves are not energized and frequent opening/closing of the valves is not executed. As a result, durability of the valves is improved.

In the present embodiment, since the expected lateral acceleration GRLM is calculated based on not only the estimated lateral acceleration GRL but also on the estimated lateral accelerating rate GRL, attitude control can be started just before the vehicle attitude actually changes. Namely, accurate feedforward control can be realized. It is of course possible to calculate the expected lateral acceleration GRLM based solely on either the estimated acceleration GRL or the estimated lateral accelerating rate GRL. Alternatively, it is possible to calculate the expected acceleration GRLM directly from the actual lateral acceleration GRL and its differential GRL, without utilizing the estimated lateral acceleration GRL and the estimated lateral accelerating rate GRL.

In the present embodiment, the feedforward gain k1 and the feedback gains k2 and k3 are calculated in response to |GRLM−GRL|, i.e., the difference between the expected lateral acceleration GRLM and the actual lateral acceleration GRL. It is, however, possible to use a steering angle speed $\theta$ instead of |GRLM−GRL|. In this case, a map showing a relation between the steering angle speed $\theta$ and the gains k1, k2 and k3 is stored in the ROM 104 instead of FIG. 13. Thus, the attitude control based mainly on the feedback control can be executed while the vehicle height is kept unchanged. Moreover, the estimated accelerating rate GRL can be used in place of the steering angle speed $\theta$ for calculating the feedforward gain k1 and the feedback gains k2 and k3.

Furthermore, the feedforward gain k1 and the feedback gains k2 and k3 can be calculated based on the actual accelerating rate GRL in place of |GRLM−GRL|. Though the speed of response based on GRL is slower than that based on |GRLM−GRL|, more accurate feedback control can be realized because GRL better reflects the actual vehicle height changes.

Still further, the feedforward gain k1 and the feedback gains k2 and k3 can be calculated based on the differential XR of the roll displacement XR. In comparison with the calculation based on |GRLM−GRL|, however, the speed of response becomes further slower. An advantage is seen in that the advance control based on the feedforward control is not unnecessarily executed when the friction coefficient of the road is low. As another advantage, stable feedback control corresponding to the actual rolling speed can be realized.

In the feedforward calculation routine of the present embodiment, the estimated lateral acceleration GRL is calculated based on the vehicle speed V and the steering angle $\theta$ at step 280 with reference to the map of FIG. 10, and the estimated lateral accelerating rate GRL is calculated from the vehicle speed V and the steering angle speed $\theta$ at step 290 with reference to the map of FIG. 11. If a longitudinal acceleration and longitudinal accelerating rate are estimated instead of the lateral counterparts GRL and GRL, pitch of the body can be controlled. An estimated longitudinal acceleration GFR is determined based on the vehicle speed V and a throttle opening $\theta$TH with reference to the map of FIG. 23, and an estimated longitudinal accelerating rate GFR is obtained based on the vehicle speed V and a throttle opening speed $\theta$TH with reference to the map of FIG. 24. Then a longitudinal acceleration GFRM is expected from the estimated longitudinal acceleration GFR and the longitudinal accelerating rate GFR and the squat of the body is controlled. The throttle opening $\theta$TH and the throttle opening speed $\theta$TH are detected by a throttle opening sensor 96.

Moreover, a rotational speed N of the engine can be used instead of the vehicle speed V. Namely, the estimated longitudinal acceleration GFR is determined based on the engine speed N and the throttle opening θTH with reference to FIG. 25, and the estimated longitudinal accelerating rate GFR is obtained from the engine speed N and the throttle opening speed θTH with reference to FIG. 26. By utilizing the estimated longitudinal acceleration GFR and the estimated longitudinal accelerating rate GFR, the expected acceleration GFRM is calculated. The engine speed N is detected by the speed sensor 93.

An anti-dive control can be similarly performed. A brake pedal displacement θBR and its differential, a braking speed, θBR may be used in place of the throttle valve opening θTH and the throttle opening speed θTH. Namely, the estimated longitudinal acceleration GFR is obtained from the vehicle speed V and the brake pedal displacement θBR based on FIG. 27, and the estimated longitudinal accelerating rate GFR is determined from the vehicle speed V and the braking speed θBR based on FIG. 28. By utilizing the estimated longitudinal acceleration GFR and the estimated longitudinal accelerating rate GFR, the expected longitudinal acceleration GFRM can be calculated. The brake pedal displacement θBR and the braking speed θBR are detected by a brake sensor for outputting signals corresponding to the brake pedal displacement to the ECU 100.

These expected longitudinal accelerations GFRM calculated in the anti-squat control and the anti-dive control are independently used for the suspension control corresponding to each of the above-mentioned modes. It is also possible to combine the individual GFRM to cope with plural modes simultaneously. Thereby excessive control for squat and dive as well as roll of the vehicle can be prevented for the initial period of control. As a result, smooth suspension control for providing highly improved maneuverability can be realized. Moreover, the combination of the expected lateral acceleration GRLM calculated in the anti-roll control and the longitudinal acceleration GFRM is also available for controlling both roll and pitch of the vehicle.

Figure 29:
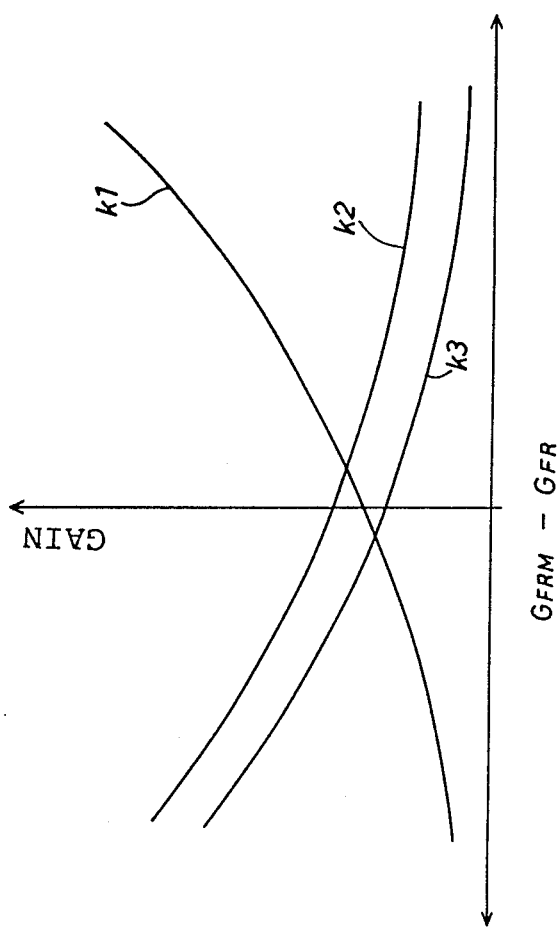
FIG. 29 is a graph showing a map for determining the feedforward gain k1 and the feedback gains k2 and k3 based on a difference between the expected longitudinal acceleration GFRM and the actual longitudinal acceleration GFR.

The feedforward gain k1 in the feedforward control and the feedback gains k2 and k3 in the feedback control are calculated similarly in the anti-squat control and the anti-dive control. They are also determined based on |GFRM−GFR|, i.e., the difference between the expected longitudinal acceleration GFRM and the actual longitudinal acceleration GFR with reference to a map similar to FIG. 13. Otherwise they can be calculated based on a non-linear map as shown in FIG. 29. The feed forward gain k1 and the feedback gains k2 and k3 are calculated not necessarily based on |GFRM−GFR|. They may be calculated based on the throttle valve opening speed θTH or the braking speed θBR, estimated longitudinal accelerating rate GFR, the actual acceleration GFR or the differential XR of the pitch displacement XR.

In the present embodiment, the air circuit AC and process steps 510, 610 through 640 correspond to the fluid flow control means M6; process steps 230 through 330 act as the advance control means M2; process steps 410 through 430 correspond to the feedback control means M3; and the process steps 340, 350, 440 through 470 act as the share determination means M4.

While the invention has been particularly shown and described with reference to a preferred embodiment, it will be understood by those skilled in the art that various other changes in form and detail may be made without departing from the spirit and scope of the invention.

What is claimed is:

1. An electronic controlled fluid suspension system for a vehicle comprising:
    a plurality of fluid actuators, one corresponding to each wheel of the vehicle;
    a driving state detection means for detecting driving parameters of the vehicle;
    an advance control means responsive to the detected driving parameters for anticipating a change in an attitude of the vehicle caused by a change in direction or velocity of the vehicle and for generating an advance control amount to alleviate the anticipated change in the attitude of the vehicle;
    a feedback control means responsive to the detected driving parameters for measuring the change in attitude of the vehicle and generating a feedback control amount in order to alleviate the measured change in the attitude of the vehicle;
    a share determination means responsive to the detected driving parameters for determining shares of the advance control amount and the feedback control amount;
    a control amount generating means for generating a final control amount from the advance control amount and the feedback control amount according to the determined shares; and
    a fluid flow control means responsive to the final control amount for controlling fluid flow from and into the fluid actuators.

2. The electronic controlled fluid suspension system according to claim 1, wherein:
    the driving state detection means comprises a means for detecting a vehicle speed V, a means for detecting a displacement θBR of a brake pedal of the vehicle and a means for detecting a longitudinal acceleration GFR;
    the advance control means, responsive to the detected vehicle speed V and the detected brake pedal displacement θ BR, generates the advance control amount in order to alleviate a diving of the vehicle; and
    the share determination means comprises a means, responsive to the detected vehicle speed V and the detected brake pedal displacement θBR, for anticipating a longitudinal acceleration GFRM of the vehicle, and a means responsive to a difference between the detected longitudinal acceleration GFR and the anticipated longitudinal acceleration GFRM for determining the shares.

3. The electronic controlled fluid suspension system according to claim 1, wherein:
    the driving state detection means comprises a means for detecting a vehicle speed V, a means for detecting a throttle opening θTH of an internal combustion engine of the vehicle and a means for detecting a longitudinal acceleration GFR;
    the advance control means, responsive to the detected vehicle speed V and the detected throttle opening θTH, generates the advance control amount in order to alleviate a squat of the vehicle; and
    the share determination means comprises a means, responsive to the detected vehicle speed V and the detected throttle opening θTH, for anticipating a longitudinal acceleration GFRM of the vehicle, and a means responsive to a difference between the detected longitudinal acceleration GFR and the anticipated longitudinal acceleration GFRM for determining the shares.

4. The electronic controlled fluid suspension system according to claim 1, wherein:

the driving state detection means comprises a means for detecting a rotational speed N of an internal combustion engine of the vehicle, a means for detecting a throttle opening θTH of the internal combustion engine and a means for detecting a longitudinal acceleration GFR;

the advance control means, responsive to the detected engine speed N and the detected throttle opening θTH, generates the advance control amount in order to alleviate a squat of the vehicle; and the share determination means comprises a means, responsive to the detected engine speed N and the detected throttle opening θTH for anticipating a longitudinal acceleration GFRM of the vehicle, and a means responsive to a difference between the detected longitudinal acceleration GFR and the anticipated longitudinal acceleration GFRM for determining the shares.

5. The electronic controlled fluid suspension system according to claim 1, wherein:

the driving state detection means comprises a means for detecting a vehicle speed V, a means for detecting a steering angle θ and a means for detecting a lateral acceleration GRL;

the advance control means, responsive to the detected vehicle speed V and the detected steering angle θ, generates the advance control amount in order to alleviate a roll of the vehicle; and the share determination means comprises a means responsive to the detected vehicle speed V and the detected steering angle θ for anticipating a lateral acceleration GRLM of the vehicle and a means responsive to a difference between the detected lateral acceleration GRL and the anticipated lateral acceleration GRLM for determining the shares.

6. The electronic controlled fluid suspension system according to claim 5, wherein:

the fluid flow control means controls the fluid flow with a cycle time of a first predetermined time interval;

the advance control means anticipates the change of attitude a second predetermined time interval later, the second predetermined time interval being equal to or longer than the first predetermined time interval; and the control amount generating means determines the final control amount with a cycle time of a third predetermined time interval, the third predetermined time interval being equal to or shorter than the first predetermined time interval.

7. The electronic controlled fluid suspension system according to claim 6, wherein:

the fluid flow control means comprises an electro magnetic valve which is turned on and off according to a pulse signal, a ratio of the on-period and the off-period of the pulse signal being a duty ratio; and the control amount generating means comprises a means for generating the pulse signal whose duty ratio represents the final control amount, and a means for filtering the pulse signal whereby the pulse signal having a duty ratio out of a preset range is prevented from being output to the fluid flow control means.

8. The electronic controlled fluid suspension system according to claim 7, wherein:

the driving state detection means further comprises a means for detecting a body height at each wheel of the vehicle;

the feedback control means comprises a means responsive to the detected body heights for calculating a warp of a body of the vehicle; and the control amount generating means further comprises a means for setting the preset range according to the calculated warp of the body.

* * * * *